United States Patent
Hiyama et al.

(10) Patent No.: US 7,084,850 B2
(45) Date of Patent: Aug. 1, 2006

(54) IMAGE DISPLAY SYSTEM AND IMAGE INFORMATION TRANSMISSION METHOD

(75) Inventors: Ikuo Hiyama, Hitachinaka (JP); Tsunenori Yamamoto, Hitachi (JP); Akitoyo Konno, Hitachi (JP); Makoto Tsumura, Hitachi (JP); Yoshiyuki Kaneko, Hachioji (JP); Yoshiro Mikami, Hitachiota (JP); Tatsuki Inuzuka, Mito (JP); Yasutaka Toyoda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 513 days.

(21) Appl. No.: 09/961,176

(22) Filed: Sep. 24, 2001

(65) Prior Publication Data
US 2002/0105506 A1 Aug. 8, 2002

(30) Foreign Application Priority Data
Feb. 7, 2001 (JP) ........................... 2001-030374

(51) Int. Cl.
G09G 3/36 (2006.01)

(52) U.S. Cl. .......................... 345/98; 345/103
(58) Field of Classification Search ........... 345/94, 345/95, 96, 98, 99, 103, 204, 619 T; 348/408, 348/413, 414, 421.1, 425.3, 425.4, 430.1, 348/790, 452, 416.1, 420.1
See application file for complete search history.

(56) References Cited

U.S. PATENT DOCUMENTS

| | | | | |
|---|---|---|---|---|
| 5,047,849 A | * | 9/1991 | Hara | 348/383 |
| 5,555,511 A | * | 9/1996 | Ooi | 358/1.15 |
| 5,666,161 A | * | 9/1997 | Kohiyama et al. | 375/240.18 |
| 6,463,183 B1 | * | 10/2002 | Mizuno | 382/282 |
| 6,600,828 B1 | * | 7/2003 | Kawamura | 382/100 |

FOREIGN PATENT DOCUMENTS

| | | |
|---|---|---|
| JP | 2277386 | 11/1990 |
| JP | 06205293 | 7/1994 |
| JP | 86526 | 1/1996 |
| JP | 9329807 | 12/1997 |
| JP | 1166289 | 3/1999 |
| JP | 2000 261768 | 9/2000 |
| JP | 200136900 | 2/2001 |
| JP | 2002 182634 | 6/2002 |

OTHER PUBLICATIONS

H. Ishiguro, et al Consideration on Motion Picture Quality of the Hold Type Display with an Octupie–rate CRT, Technical Report of IEICE, The Institute of Electronics, Information and Communication Engineers, Jun. 1996, pp. 19–26.

* cited by examiner

Primary Examiner—Vijay Shankar
Assistant Examiner—Nitin Patel
(74) Attorney, Agent, or Firm—Mattingly, Stanger, Malur & Brundidge, P.C.

(57) ABSTRACT

To provide a display device capable of displaying a moving picture with high definition and at high speed. An image display system includes: an image display unit; and a control unit. The control unit has: a block discrimination circuit portion; an image processing portion; a storage portion; and a synchronizing signal generation portion. The block discrimination circuit portion discriminates a moving picture or a still picture to process the image information in accordance with the discriminated result, in which the number of gradations for the image information processed when the discriminated result is the moving picture is lower than when the discriminated result is the still picture. Thereby, the high definition image display and the high speed moving picture display can be effected by reducing the information with lower degree of recognition.

16 Claims, 18 Drawing Sheets

FIG.9

ORIGINAL IMAGE DATA 500

| 250 | 230 | 200 | 150 |
|---|---|---|---|
| 240 | 200 | 120 | 100 |
| 200 | 180 | 90 | 80 |
| 170 | 90 | 70 | 60 |
| 150 | 80 | 60 | 50 |
| 130 | 70 | 40 | 30 |
| 120 | 50 | 25 | 20 |
| 100 | 30 | 10 | 0 |

514 COMPRESSED IMAGE DATA OF STILL PICTURE

| 240 | 240 | 240 | 156 |
|---|---|---|---|
| 240 | 240 | 92 | 92 |
| 240 | 156 | 92 | 92 |
| 156 | 92 | 92 | 28 |
| 156 | 92 | 28 | 28 |
| 156 | 92 | 28 | 28 |
| 92 | 28 | 28 | 28 |
| 92 | 28 | 28 | 28 |

532 COMPRESSED IMAGE DATA OF HIGH SPEED MOVING PICTURE

| 240 | 240 | 137 | 137 |
|---|---|---|---|
| 240 | 240 | 137 | 137 |
| 137 | 137 | 65 | 65 |
| 137 | 137 | 65 | 65 |
| 137 | 137 | 65 | 65 |
| 137 | 137 | 65 | 65 |
| 65 | 65 | 8 | 8 |
| 65 | 65 | 8 | 8 |

533 COMPRESSED IMAGE DATA OF HIGH SPEED MOVING PICTURE

| 241 | 241 | 241 | 241 |
|---|---|---|---|
| 241 | 241 | 141 | 241 |
| 241 | 241 | 48 | 48 |
| 241 | 241 | 48 | 48 |
| 48 | 48 | 48 | 48 |
| 48 | 48 | 48 | 48 |
| 48 | 48 | 48 | 48 |
| 48 | 48 | 48 | 48 |

IMAGE DISPLAY SYSTEM AND IMAGE INFORMATION TRANSMISSION METHOD

BACKGROUND OF THE INVENTION

The present invention relates to an image display system, and more particularly to an image information transmission method in which the resolution, the number of gray scale level, and the rewriting speed for the display are changeable within the screen.

In recent years, an image display apparatus has become thinner and lighter, a flat panel display such as a liquid crystal display, a PDP (Plasma Display Panel), and an EL display (Electroluminescent Display) has rapidly spread, in place of a CRT that was mainly employed for the image display apparatus. Also, the technical development of an FED (Field Emission Display) has also rapidly progressed. Moreover, the display of high definition, high speed moving picture has become requisite, along with the spread of personal computers, DVD, and digital broadcasting. There will be an increasing demand in the future for the higher performance of the image display unit, and particularly, the display of high definition, high speed moving picture. In particular, the liquid crystal display has been greatly expected as a predominant entity of the FPD.

Thus, a method of driving a TFT active matrix that is typical of the conventional method of driving the liquid crystal display will be described below. In driving the TFT active matrix liquid crystal display, a line sequential scanning method is employed, one scanning pulse being applied to each scanning electrode once for each frame time period. One frame time period of about $1/60$ seconds is often used, and this pulse is usually applied from the upper side of the panel to the lower side successively at a shifted timing. Accordingly, in a liquid crystal display unit having as many as 1024×768 pixels, 768 gate wires are scanned within one frame, so that the time width of scanning pulse is equal to about 22 μs [=(1/60)×(1/768)(seconds)].

On one hand, a liquid crystal driving voltage for driving a liquid crystal with the pixels of one line to which a scanning pulse is applied, is applied simultaneously to the signal electrodes in synchronism with the scanning pulse. At a selected pixel to which a gate pulse is applied, the gate electrode voltage of a TFT connected to the scanning electrode is increased, so that the TFT is placed in on state. At this time, the liquid crystal driving voltage is applied to a display electrode through the source-to-drain of the TFT to charge a pixel capacitance composed of a liquid crystal capacitance formed between the display electrode and an opposite electrode formed on an opposite substrate and a load capacitance in a pixel within a time period of 22 μs as previously mentioned. By repeating this operation, a liquid crystal applied voltage is applied repetitively at every frame time to the pixel capacitance over the entire face of panel.

Since the conventional TFT active matrix driving is performed as in the above operation, the time width of scanning pulse is shorter along with the higher definition and the increasing number of pixels. Namely, it is required to charge the pixel capacitance within a short time period. Also, to cope with the high speed moving pictures, one frame time must be still shortened, in which the time width of scanning pulse is also shorter.

That is, with the conventional driving method for the image display method or the image display unit, it is difficult to cope with an increase in the display frequency that is caused by the higher definition display, due to a signal delay on the wiring, shortage of the writing time into each pixel, and increased scanning frequency.

In a hold luminescence type image display unit such as a liquid crystal display, when the moving picture is displayed, the image quality may be degraded, as described in IEICE (The Institute of Electronics, Information and Communication Engineers) Transaction EID96-4, pp. 19–26 (1996-06). According to this report, since there is inconsistency between a moving picture that is in hold luminescent and the movement of the line of sight pursuing the moving picture, some blur occurs in the moving picture, degrading the display quality of moving picture. To improve the display quality of moving picture, it was reported that there was a method of providing n times the frame frequency. The method of providing n times the frame frequency involves increasing the display frequency in displaying the moving picture clearly on the hold luminescence type image display unit such as the liquid crystal display. However, with the driving method for the image display method or the image display unit that is employed at present, as already described, the increase in display frequency has approached its upper limit.

In order to cope with the high definition display or moving picture display for which there is increasing demand in the future, new materials have been examined to reduce the wiring resistance or wiring capacitance that is a factor of the signal delay on the wiring. Also, to enhance the writing capability into the pixels, instead of the conventional thin film transistor (TFT) using amorphous silicone, the TFT using polysilicone has been put on the market recently.

Moreover, in JP-A-08-006526 specification, there was described a liquid crystal image display unit having means for switching between one line selection and simultaneous selection of plural lines to change the resolution. However, with this technique, the resolution is constant on the line. Also, there was no description for the method of effecting both high definition and high speed display at the same time. Further, in JP-A-09-329807 specification, there was described a liquid crystal image display unit having block selecting means for reducing the consumption power, in which the changed images are only rewritten in a unit of block. However, the high speed moving picture display is difficult to make due to the signal delay on the wiring and the limited writing capability, while displaying the moving picture to be rewritten on the entire screen.

The image transmission from an image control unit (a so-called graphics controller board) for effecting high definition, high speed display to the image display unit is now considered. As an example of the image display unit, taking the conventional liquid crystal display having as many as 1024×768 pixels, with eight bits for each color of red, green and blue (16 million colors) and a frame frequency of 60 Hz, the bit rate is about 1.1 Gbps, which can not be transferred with one data line. Thus, employing 24 data lines, for example, the data is transmitted to a liquid crystal panel at a lower bit rate per line. Accordingly, the image processing of the image control unit, and the transmission between the image control unit and the image display unit become difficult to make, along with the increased number of pixels and the higher frequency corresponding to the high definition and high speed display.

As described above, to make the high definition or high speed moving picture display, it is required to charge the pixel capacitance at a liquid crystal driving voltage within a short time, and a driving method to treat the high definition and high speed moving picture is needed. Further, since the image processing of the image control unit, and the transmission between the image control unit and the image display unit become difficult to make, the driving method and the transmission method capable of displaying the high definition, high speed moving picture that is increasingly demanded in the future must be provided. Also, there is a demand for the image driving method and the transmission method with flexible procedures that can be employed directly even though the wiring material or the capability of active elements is enhanced.

According to the study of human eyes' visual characteristics, when the moving picture is displayed, the image quality can be sufficiently kept even if the definition or the number of gray scale level is not too increased, because the moving picture is being rewritten at high speed. On the other hand, when the still picture is displayed, though there is no need for rewriting at high speed, the high definition display is required to recognize the image quality sufficient.

SUMMARY OF THE INVENTION

A first object of the present invention is to provide an image transmission method conformable to the high definition image display and high speed moving picture display at the same time, making use of the visual characteristics of the human eyes for the still picture display and the moving picture display, and reducing the information with low degree of recognition.

A second object of the invention is to provide an image transmission method conformable to the image display that can switch between an area for rewriting the moving picture at high speed and with lower definition and an area for rewriting the still picture at low speed and with high definition, in order to implement the high definition/high speed moving picture display, making use of the visual characteristics of the human eyes for the still picture display and the moving picture display.

A third object of the invention is to provide an image display system consisting of an image generation unit, an image control unit and an image display unit, and having an image transmission method of transmitting the image between each unit in which the high definition display and the high speed moving picture display can be implemented at the same time.

In order to attain the above objects, according to the present invention, there is provided an image information transmission method of transmitting the image information from an image control unit to an image display unit in a system consisting of the image display unit having a plurality of pixels arranged like a matrix to display the image information and the image control unit for transmitting the image information to the image display unit, wherein the image control unit processes the image information in a pixel block unit with the information of a block state appended in which the plurality of pixels are divided into m pixel block units (m is a natural number of 2 or greater), and the data transfer period is controlled in accordance with the state of image information.

Also, according to the invention, there is provided an image information transmission method of transmitting the image information from an image control unit to an image display unit in a system consisting of the image display unit having a plurality of pixels arranged like a matrix to display the image information and the image control unit for transmitting the image information to the image display unit, wherein the image control unit has a block state discrimination circuit for discriminating a state of image information amounting to one screen in a pixel block unit to append the information of the state to the image information corresponding to the pixel block unit, and processes the image information corresponding to each pixel block unit with the information of the state appended by the block state discrimination circuit, whereby the data transfer period is controlled in accordance with the state of image information.

Further, the invention provides an image transmission method of transmitting the image information in which the information of block state is a moving picture state or a still picture state, and the data transfer period for the still picture state controlled by the image control unit is n times the data transfer period for the moving picture state. Further, the invention provides the image transmission method of transmitting the image information in which the information of pixel block in the moving picture state is compressed in terms of the number of gray scale level or the resolution. Thereby, in the moving picture state, the image information of one screen can be compressed, and transferred at higher speed, while in the still picture state, the image information of one screen can be transferred at lower frequency, whereby the liquid crystal display unit can display consistently the high speed moving picture and the high definition still picture.

Further, the invention allows a clear moving picture to be displayed without blur of the moving picture by transmitting the information of pixel block that is in the moving picture state by generating interpolated data between frames. Preferably, the information of pixel block that is in the moving picture state is transmitted at a compression ratio corresponding to the movement speed of the image information, whereby in the still picture area, a still picture can be displayed at high definition, and in the high speed moving picture area, a clear moving picture can be displayed. A slow speed moving picture can be displayed at higher definition and clearly.

Also, according to the invention, there is provided an image transmission method for use in an image display system having an image generation unit for generating the image information, an image control unit for converting the image information in correspondence to an image display unit for displaying the image information, and the image display unit for displaying an image corresponding to the image data from the image control unit, wherein the image data of one screen for the image display unit has at least one of a moving picture area and a still picture area, each area containing discrimination data indicating a moving picture or a still picture, the moving picture data is compressed into one n-th, in contrast to the still picture data, in terms of at least one of the number of pixels or the number of gray scale level, corresponding to the discrimination data, and the still picture data is transmitted at a transfer period at least n times faster than that of the moving picture data, whereby the image data is transferred at an equal transfer rate for different picture areas.

In the compression of the image data, the image data is compressed in a unit of m1×m2 pixels, and the display pixel is preferably square or rectangular in a unit of 2×2, 2×1, 4×4, 4×2, 8×8, 8×4, or 8×2, for example. The liquid crystal display unit employs a line sequential scanning method to compress the image in a unit of rectangle, and define the scanning lines of the liquid crystal display unit in a longitudinal direction, whereby the high definition and high speed display can be effected to enable a plurality of pixels to be written at the same time.

Also, the image control unit has a moving picture memory and a still picture memory, and each image data is written beforehand in each frame memory in accordance with the discrimination data, so that the image data can be read and transferred at high rate.

Preferably, the image control device generates the n-times speed movement correction data for the moving picture, and transfers it to the image display unit, whereby the hold type display unit can be enhanced in the image quality of moving picture. Herein, the n-times speed data is preferably the data of double speed, and more preferably the data of quadruple speed. According to EID96-4, pp. 19–22 as previously mentioned, the permissible limit of moving picture can be implemented with the double speed display, and the sensing limit can be implemented with the quadruple speed display.

Also, according to the movement speed of moving picture area, when the high speed display is needed, the amount of image data can be greatly reduced by image compression, and when the high speed display is not needed, the image data is transferred at lower image compression ratio to enable the display in accordance with the movement speed of moving picture.

Preferably, the image data is efficiently transferred by changing the image compression ratio in accordance with the size of a display window in the moving picture area and the display resolution. Further, the image data can be transferred efficiently by compressing the image data in accordance with the number of gray scale level and the display gradation ratio.

Also, this invention provides a broadcasting form for transmitting the image information employing a transmission system in which the image information has a moving picture flag and a still picture flag in a unit of block of plural pixels, and corresponding to the flag, the image information of one screen in a still picture flag area is transmitted at a transmission frequency equal to n time that of a moving picture flag area. Further, the still picture and the moving picture divided in a unit of transmission frequency is subjected to compression such as MPEG that is a moving picture compression method, whereby the compression ratio can be further increased, and the large information can be transmitted through the small transmission path.

Further, this invention provides a broadcasting system employing the broadcasting form, in which by confirming beforehand or in real time the number of display pixels or the display frame frequency in an image system possessed by the user, the broadcasting service rate is charged in accordance with the image system. The transmission method of this invention allows the transmission of the high definition still picture and the high speed moving picture at high compression ratio. With the conventional TV, the image is enjoyed at an ordinary definition (NTSC), for example, the owner of the image system capable of the high definition and high speed display is billed for additional charge.

BRIEF DESCRIPTION OF THE DRAWINGS

FIG. 9 is a diagram showing one example of the image compression method of the present invention.

DESCRIPTION OF THE EMBODIMENTS

The preferred embodiments of an image transmission method and an image display system for use with the image transmission method according to the present invention will be described below by reference to FIGS. 1 to 22.

(Overall Configuration)

Figure 1:
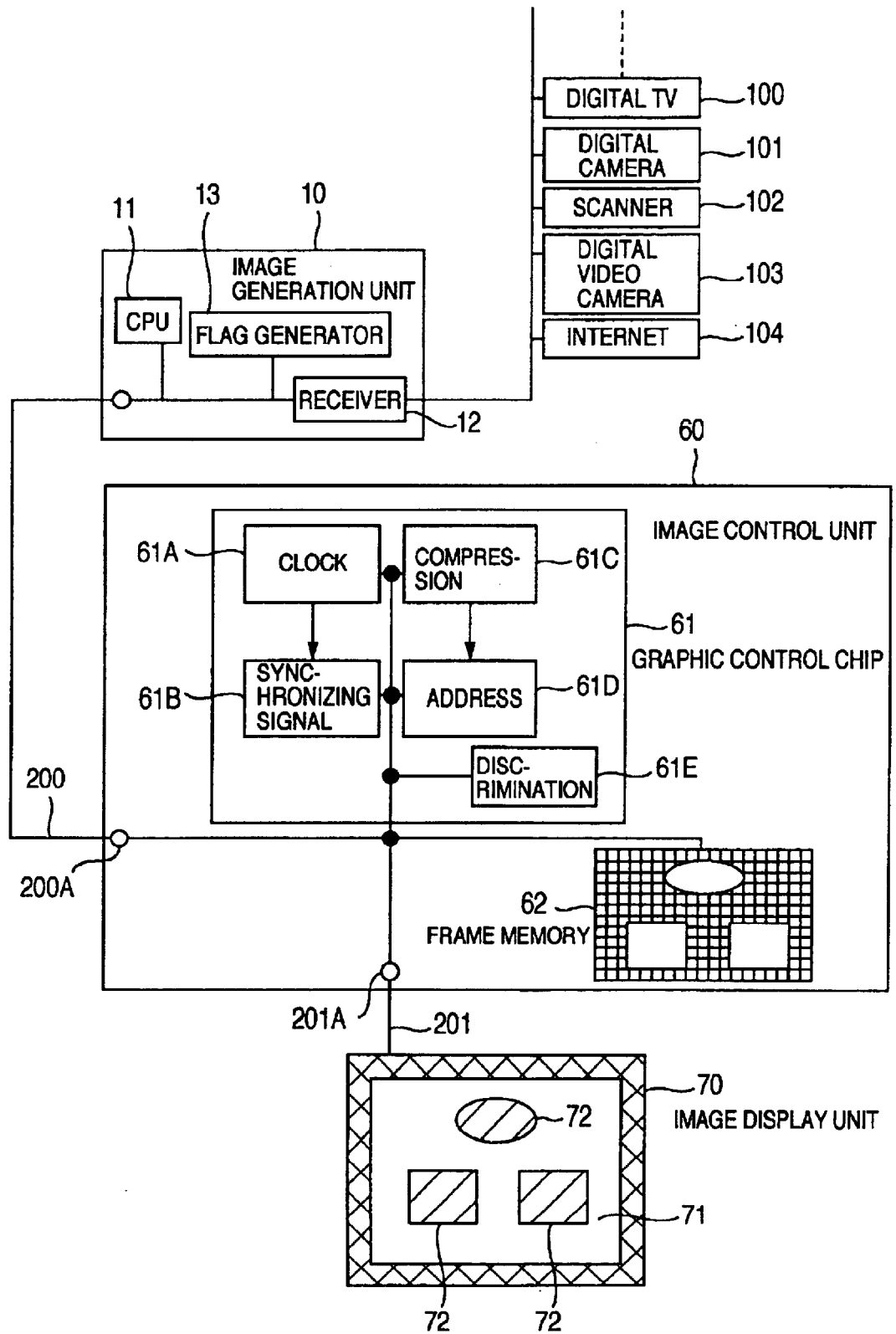
FIG. 1 is a block diagram showing one example of an image display system according to the present invention.

FIG. 1 is a block diagram showing the overall configuration of the image display system of the present invention. The image display system of an embodiment of the invention comprises an image control unit 60 and an image display unit 70. Specific product examples include televisions and personal computers. Of course, other products are also available.

The image control unit 60 has a graphic control chip 61 and a frame memory 62. For example, the image information from an image generation unit 10 is passed through a bus 200 via an input interface 200A, converted into a desired format of image data by the graphic control chip 61, and transmitted through an output cable 201 via an output interface 201A to the image display unit 70.

The image generation unit 10 has a CPU 11 and a receiver 12 for receiving the image information of a digital TV 100, a digital camera 101, a scanner 102, a digital video camera 103, and the Internet 104 from the outside, and sends or receives the image information or commands through the bus 200 to or from the image control unit 60. At this time, the image generation unit 10 preferably has a flag generation circuit 13 for generating a flag of moving picture or still picture from the data format of each image information. However, software may be used except for the flag generation circuit 13. Also, the graphic control chip 61 comprises a clock generation circuit 61A, a synchronizing signal generation circuit 61B, a compressed data generation circuit 61c for each block, an address generation circuit 61D for block compressed data, a block state discrimination circuit 61E, an input/output interface 200A, 201A, and a frame memory 62 for compressed data.

This invention involves discriminating a block state in m pixel block units (m is a natural number of 2 or greater), and changing the compression ratio or transmission frequency of data from the image control unit 60 to the image display unit 70 in accordance with the block state.

(Embodiment 1)

Figure 2:
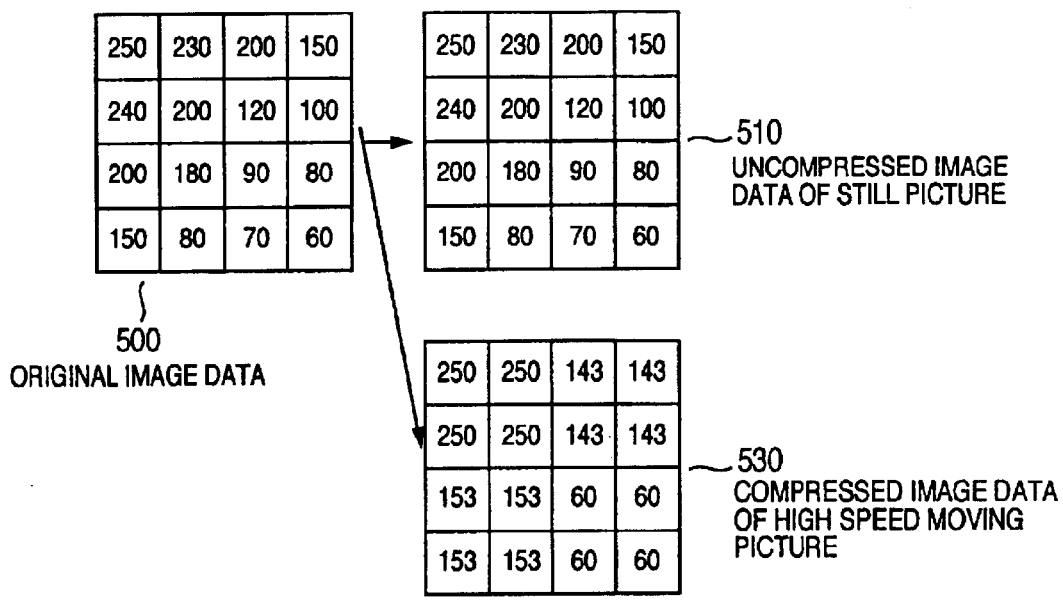
FIG. 2 is a diagram showing one example of an image compression method of the present invention.

First of all, an image compression method according to an embodiment of the present invention will be described below by reference to FIG. 2. Herein, FIG. 2 shows an example of 4×4 pixels (m=16 pixels), in which the number within each pixel indicates a gray scale level of pixel by 0 to 255 in the display having 256 gradations. For example, when the original image data 500 is discriminated as the still picture in a unit of block by the block state discrimination circuit 61E, the image conversion (16 image data) is not performed, like the still picture uncompressed image data 510, because the definition is important for the still picture, or the image compression is made with a smaller number of gradations, without decreasing the definition, as will be described later. On one hand, when the original image data 500 is discriminated as the moving picture by the block state discrimination circuit 61E, the resolution is reduced in a unit of 2×2 pixels, for example, and four image data 530 is compressed, making use of the human eyes' visual sensation of not sensing the image quality degraded due to reduced resolution or smaller number of gradations, because the moving picture has frequently changing images. Thereby, sixteen data can be compressed into four.

Figure 3:
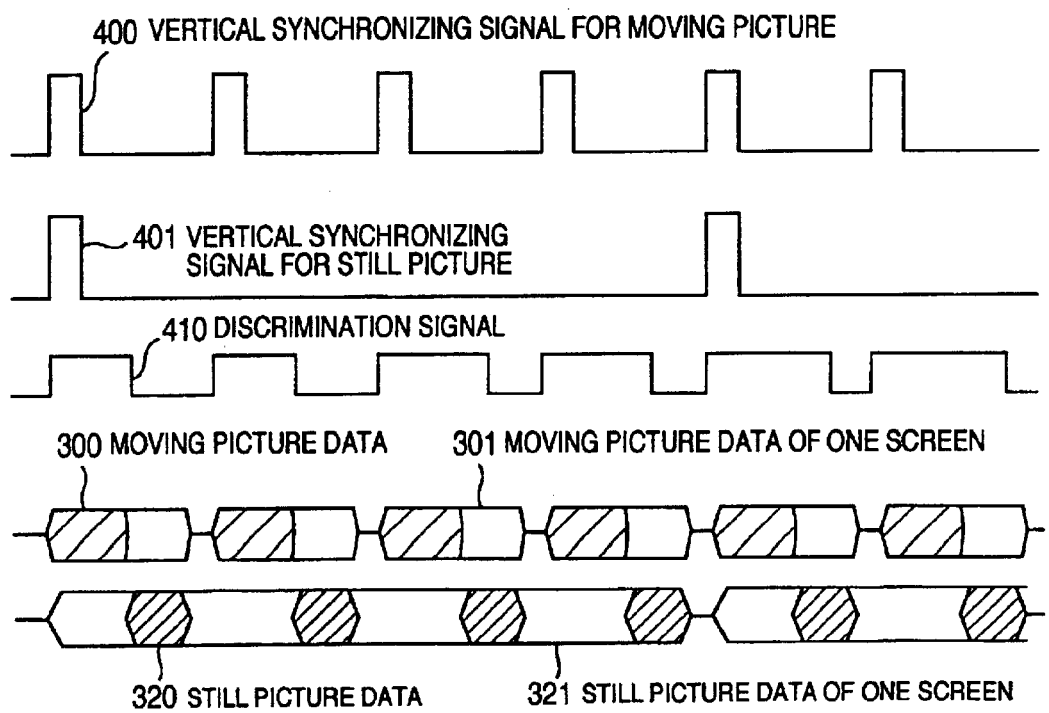
FIG. 3 is a chart showing one example of a transmission sequence of the present invention.
Figure 4A:
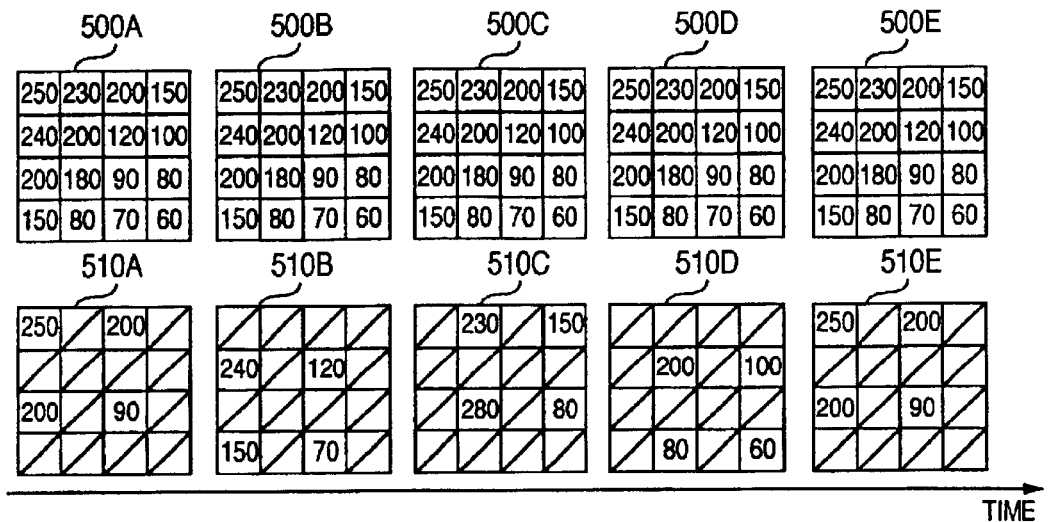
FIGS. 4A and 4B are diagrams showing one example of the image compression method of the present invention.
Figure 4B:
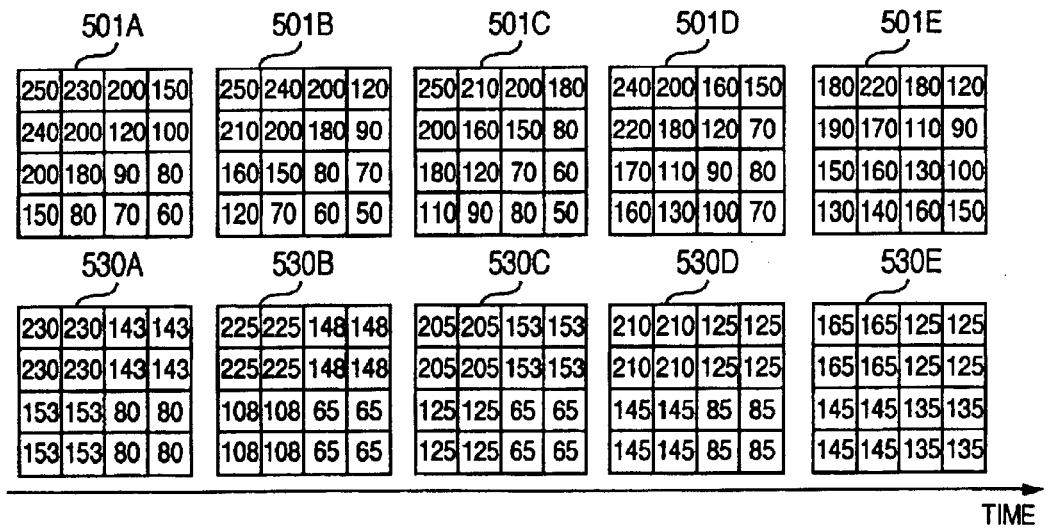

An example of a transmission sequence of the image information is shown in FIG. 3. The synchronizing signal generation circuit 61B of FIG. 1 generates a moving picture vertical synchronizing signal 400 and a still picture vertical synchronizing signal 401 with a quadruple period, and further the block discrimination circuit 61E generates a discrimination signal 410 from the image information for each block. In accordance with this discrimination signal 410, the moving picture data 300 and the still picture data 320 are transmitted. At this time, the still picture data 320 corresponds to the still picture vertical synchronizing signal 401, the data of one screen being transmitted once per four moving picture vertical synchronizing signals 400. Also, the moving picture data 300 is newly transmitted for every moving picture vertical synchronizing signal 400. Then, if the image data is transmitted at the equal resolution and the same number of gradations, the moving picture data needs a quadruple transmission rate.

Thus, it is required to transmit the image information employing the image compression method as shown in FIG. 2, to provide an transmission rate for the moving picture and the still picture. The transmission of compressed data will be described below by reference to FIGS. 4A and 4B. The moving picture or the still picture is discriminated in a unit of block, depending on the data of the block state discrimination circuit 61E of FIG. 1. Reference numerals 500A to 500E denote the original images of still picture, the original images 500A to 500E are invariable over time because the still picture does not change. Reference numerals 501A to 501E denote the original images of moving picture, which change in every frame in accordance with the movement.

First of all, the transmission of still picture will be described below. For the still picture, one pixel data within 2×2 pixels is transmitted in a first frame 510A, one pixel data within 2×2 pixels that is different from that in the first frame 510A is transmitted in a second frame 510B, and one pixel data that is different is transmitted in a third frame 510C, and then a fourth frame 510D, whereby the still picture is produced.

On the other hand, for the moving picture, an average value of 2×2 pixels is taken in the first frame 520A to transmit the same data for four pixels, an average value of 2×2 pixels is taken in the second frame 530B to transmit the same data for four pixels because the image is moved, and an average value of 2×2 pixels is taken to transmit the same data for four pixels in the third frame 530C and then the fourth frame 530D. In this way, the moving picture and the still picture can be transmitted at almost equal transmission rate. Accordingly, the high definition display can be effected in the still picture area and the clear moving picture display in the moving picture area.

(Embodiment 2)

Figure 5:
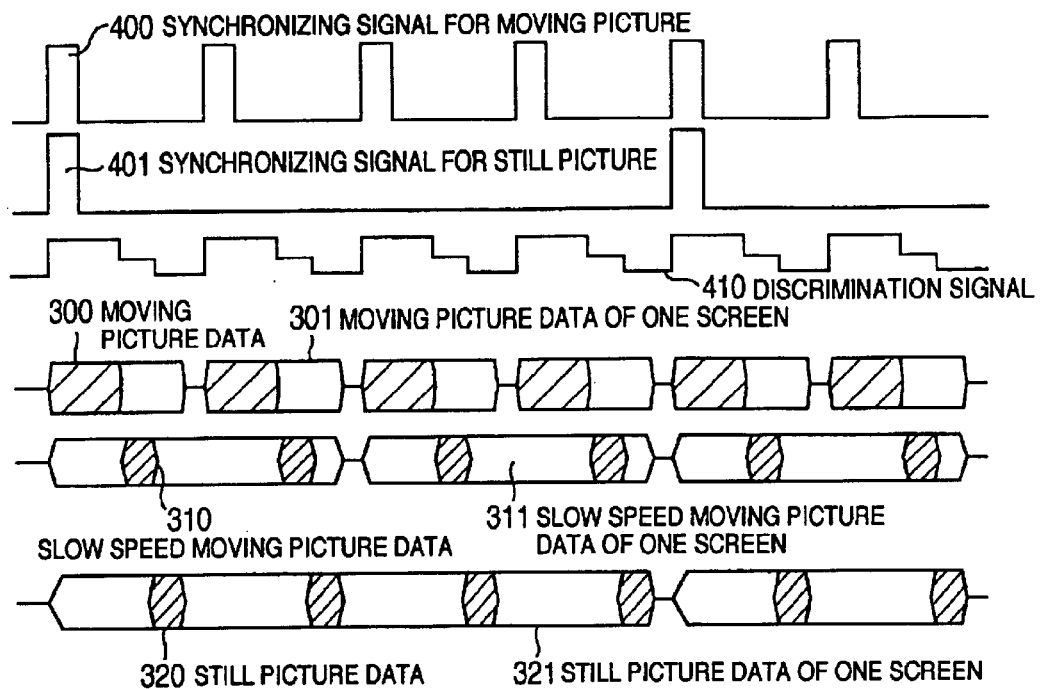
FIG. 5 is a chart showing one example of transmission sequence of the present invention.

Referring not to FIG. 5, a second embodiment in which the transmission sequence of image information is different from that of the embodiment 1 will be described below.

The synchronizing signal generation circuit 61B of FIG. 1 generates a moving picture vertical synchronizing signal 400 and a still picture vertical synchronizing signal 401 with a quadruple period, and further the block discrimination circuit 61E generates a discrimination signal 410 from the image information for each block. In accordance with this discrimination signal 410 having three levels, the moving picture data 300, the slow speed moving picture data 310 and the still picture data 320 are transmitted. Herein, the slow speed moving picture data means the moving picture with small movement, and is transmitted as an intermediate picture between the moving picture and the still picture. As in FIG. 3, the still picture data 320 corresponds to the still picture vertical synchronizing signal 401, the data of one screen being transmitted once per four moving picture vertical synchronizing signals 400. Also, the moving picture data 300 is newly transmitted for every moving picture vertical synchronizing signal 400. On the other hand, the slow speed moving picture data 310 has the data of one screen transmitted once per two moving picture vertical synchronizing signals 400. Then, if the image data is transmitted at the equal resolution and the same number of gradations, the moving picture data needs a quadruple transmission rate. For this reason, the moving picture data is compressed at half resolution, as shown in FIG. 4, and the slow speed moving picture data is compressed at half resolution in either longitudinal or transverse direction to transmit the image information. Accordingly, the still picture is displayed at high definition, the slow speed moving picture is displayed clearly at high resolution, and the moving picture is displayed clearly.

(Embodiment 3)

Figure 6:
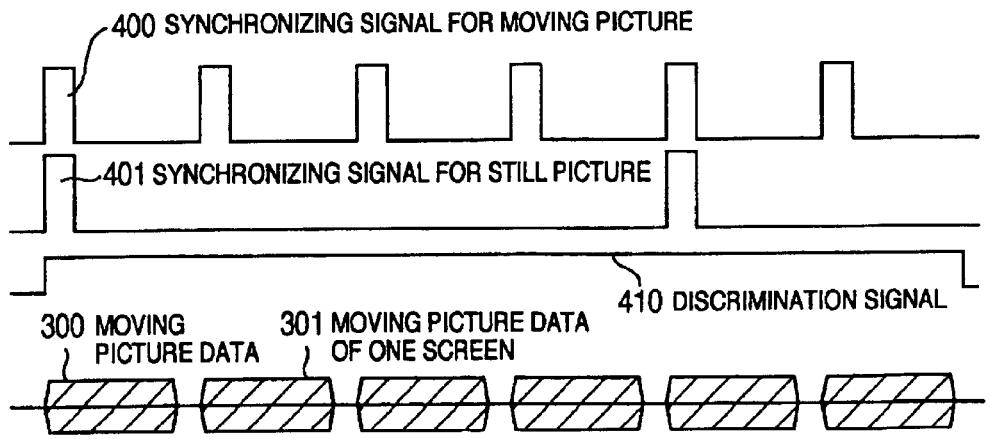
FIG. 6 is a chart showing one example of transmission sequence of the present invention.

Referring not to FIG. 6, a third embodiment as the special case in the transmission sequence of image information in the embodiments 1 and 2 will be described below. In the embodiments 1 and 2, when the entire area of one screen is a moving picture area, the moving picture data 300 is transmitted for every frame in accordance with the moving picture vertical synchronizing signal 400 to display the moving picture on the entire area of screen. Like the embodiments 1 and 2, the clear moving picture can be displayed at half resolution at high speed. On one hand, when the entire area of one screen is a still picture, the still picture data 320 is transmitted for every frame in accordance with the still picture vertical synchronizing signal 401 once per four moving picture vertical synchronizing signals 400, to display the still picture at high definition on the entire area of screen.

(Embodiment 4)

Figure 7:
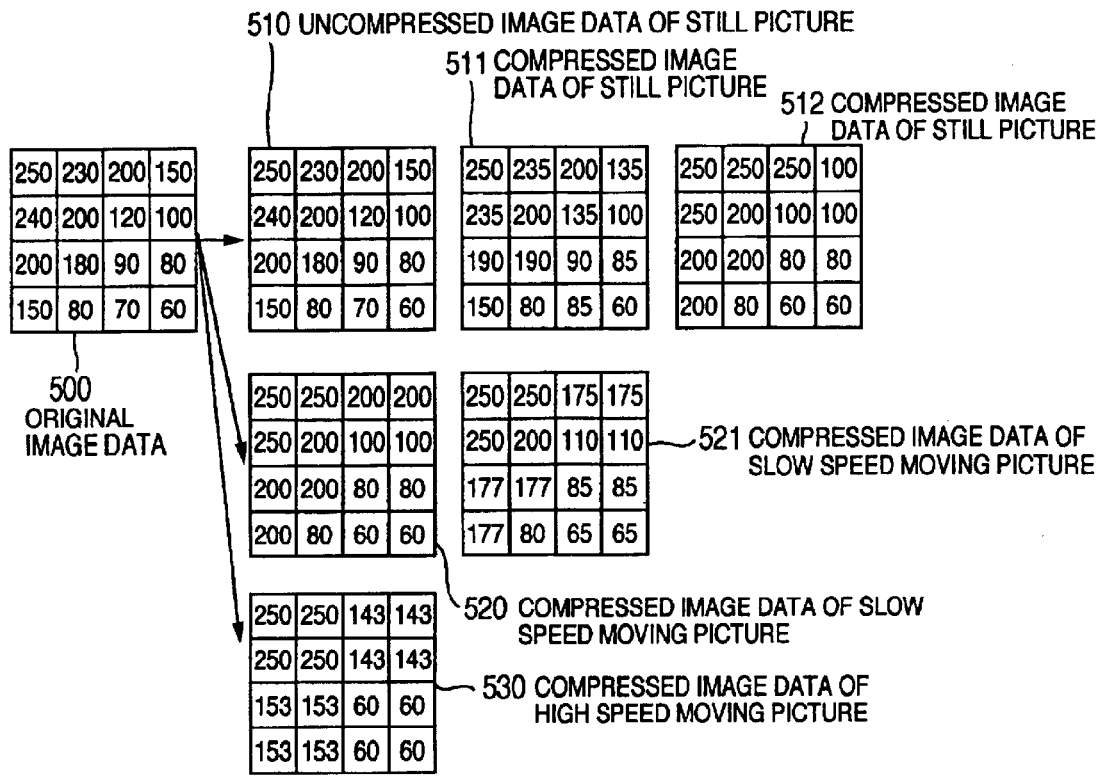
FIG. 7 is a diagram showing one example of the image compression method of the present invention.

Referring to FIG. 7, a fourth embodiment of an image compression method corresponding to a block discrimination signal 410 will be described below. If the original pixel image data 500 can be displayed on the image display unit 70, the still picture uncompressed image data 510, like the original image data, is transmitted in accordance with a sequence of FIG. 5 in the still picture display area. Also, in the moving picture area, the compressed image data 530 in which image information is compressed into one-fourth (half resolution) is transmitted in accordance with a sequence of FIG. 5. Further, in the slow speed moving picture area, the compressed image data 520 having 2×2 pixels compressed at two gradations is transmitted in accordance with a sequence of FIG. 5.

Further, if the image compression is needed for the transmission and the display on the image display unit, the compressed image data 511 having 2×2 pixels compressed at three gradations is transmitted for the still picture. If the image compression is further needed, the compressed data 512 having 2×2 pixels compressed at two gradations is transmitted. Thereby, a unit of block of 2×2 pixels can be transmitted in two frames of the moving picture vertical synchronizing signal. In transmission, the number of gradations is compressed, but the resolution is not reduced.

(Embodiment 5)

Figure 8:
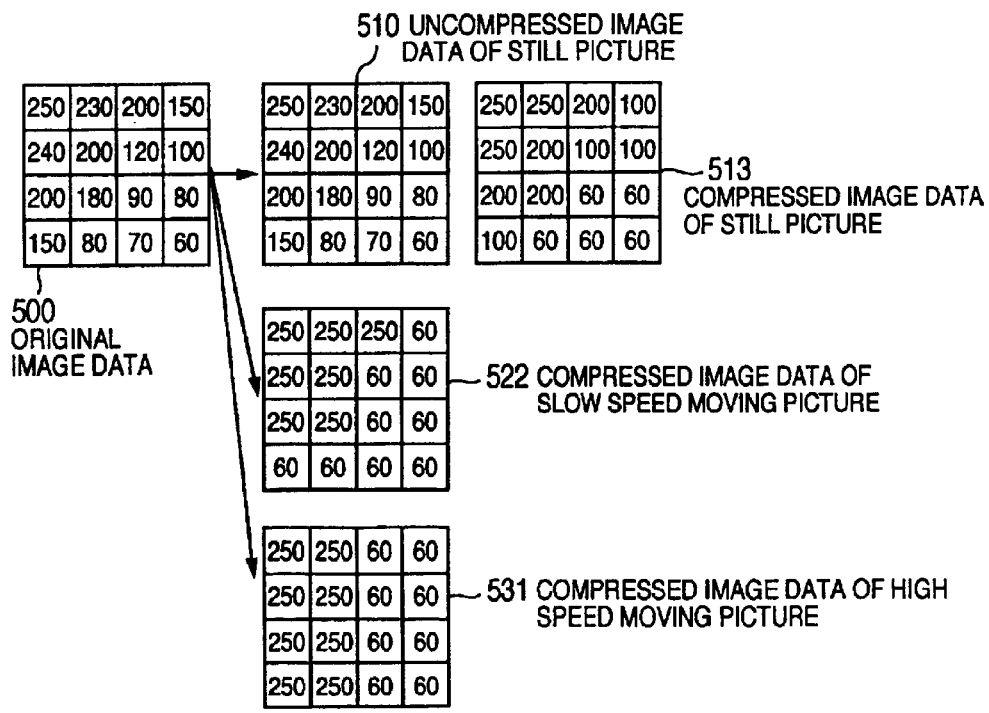
FIG. 8 is a diagram showing one example of the image compression method of the present invention.

Referring to FIG. 8, an embodiment 5 of an image compression method in which the image is more compressed than in the embodiment 4 will be described below. This embodiment 5 is involved in a block discrimination signal 410 to transmit the image data, like the embodiments 1 and 2. In the previous embodiments, the image is compressed in a unit of 2×2 pixels, but in the embodiment 5, the image is compressed in a unit of 4×4 pixels. For the still picture, the still picture compressed image data 513 approximated at four gradations in a unit of 4×4 pixels is transmitted; for the slow speed moving picture, the compressed image data 522 having 4×4 pixels approximated at arbitrary two gradations is transmitted; and for the moving picture, the moving picture compressed image data 531 having 4×4 pixels approximated at two gradations, and further approximated at one gradation in a unit of 2×2 pixels is transmitted. Employing this compression, the transmission rate can be reduced. Also, the still picture data with lower number of gradations but at high definition, and the image data with lower number of gradations and reduced resolution can be transmitted at high speed. When this image data is displayed on the image display unit, it is possible to display the clear moving picture at high speed and still picture at high definition for the human vision.

(Embodiment 6)

Referring to FIG. 9, an embodiment 6 of the image compression method in which the image is more compressed than in the embodiment 5 will be described below. This embodiment 6 is involved in the block discrimination signal 410 to transmit the image data, like the embodiments 1 and 2. In the previous embodiment 6, the image is discriminated in a unit of block of 8×4 pixels. When the original image data 500 is the still picture, it is preferred that the uncompressed image data is transmitted. If the number of pixels and the screen size become larger, the transmission and the display may be difficult, depending on the transmission rate and the display performance of the image display unit. Thus, when the still picture is displayed, the still picture compressed image data 515 approximated at four gradations in a unit of 8×4 pixels is transmitted. Further, the data compressed at two gradations is transmitted. Also, when the moving picture is displayed, the image data has the 2×2 pixels compressed at one gradation, is compressed 532 at four gradations in a unit of block of 8×4 pixels, and further is approximated 533 at two gradations, the thus image compressed data is transmitted. Thereby, the compression efficiency of transmitting the image can be enhanced.

(Embodiment 7)

Figure 10:
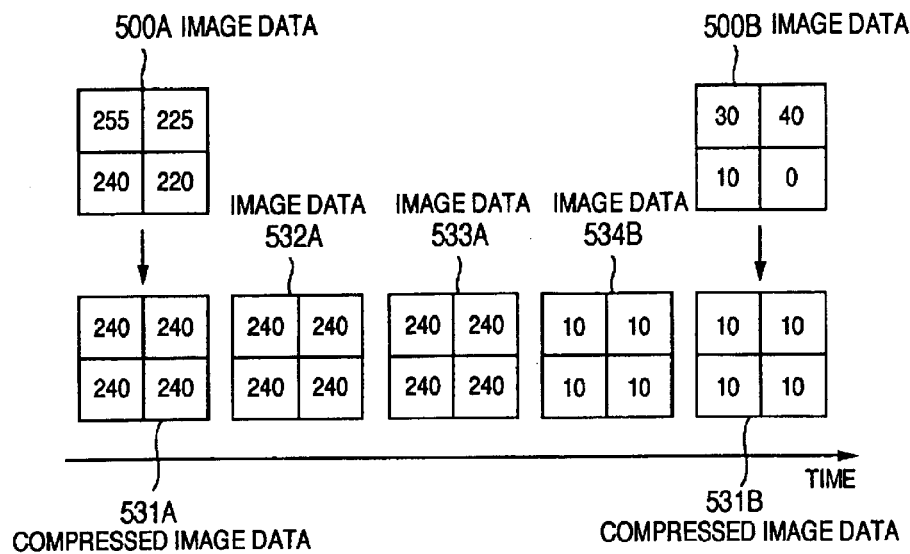
FIG. 10 is a diagram showing one example of the image compression method of the present invention.

Referring to FIG. 10, an embodiment 7 for generating the image data corresponding to the moving picture will be described below. Generally, the image data is transmitted at a frame frequency of about 60 Hz, and the moving picture becomes unclear in the hold type display, as set forth in the Prior Art. This, if the original image data 500A, 500B is transmitted at a transmission frequency of 60 Hz, the original image data is compressed into one-fourth to produce the compressed image data 531A, 531B, which is corrected for the movement by the amount of compressed image to produce the corrected image data 532A, 533A and 534B which is then transmitted. Thereby, the quadruple data transmission (at a transmission frequency of 240 Hz) can be effected without increasing the transmission rate. The original image data 500A, 500B can be equalized to produce the corrected image data, but it is preferable to detect the acceleration of a moving image object from several frames to produce the corrected image data. The corrected image data is produced and transmitted to the image display unit 70, where the clear moving picture can be displayed.

(Embodiment 8)

Figure 11:
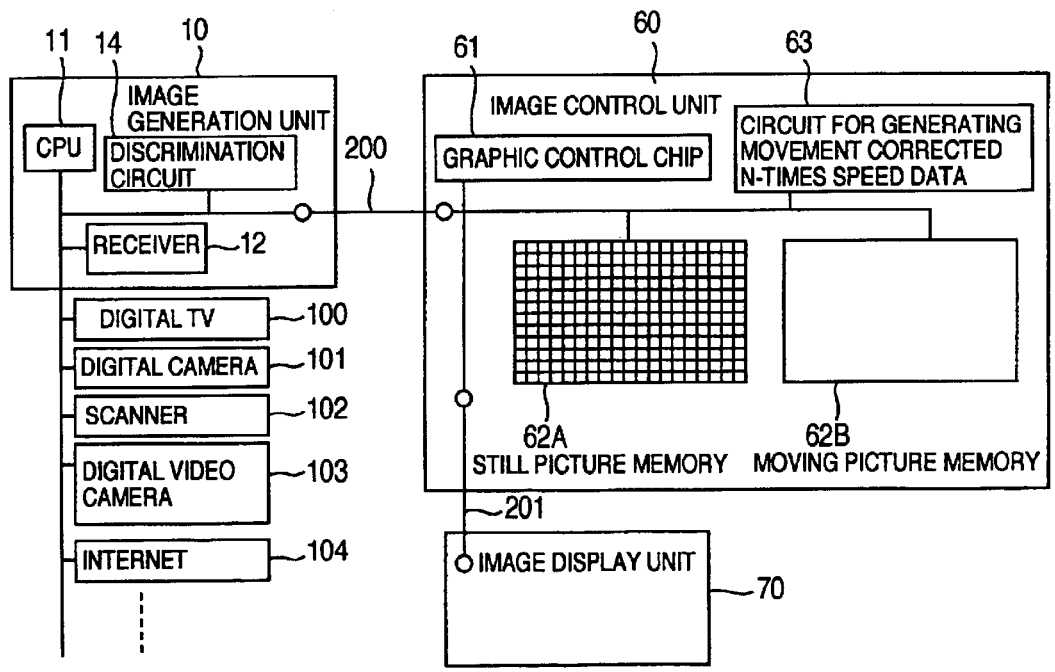
FIG. 11 is a block diagram showing one example of an image display method of the present invention.

Referring to FIG. 11, an embodiment 8 of an image display system for displaying the image by producing the corrected data of moving picture of the embodiment 7 will be described below. The embodiment 8 is the image control unit 60 of FIG. 1 in the embodiment 1 that has a movement correcting n-times speed data generation circuit 63, whereby the image in the moving picture area is compressed at resolution with the discrimination data discriminated for every block by the discrimination circuit 14, and allocated to the n-times speed data. On one hand, the image in the still picture area, designated by the discrimination data discriminated by the discrimination circuit 14 is transmitted at high definition by reducing the frame frequency but not decreasing the resolution. Thereby, the moving picture or the still picture can be transmitted at less increased transmission rate, whereby the image display unit 70 can display the high definition still picture and the clear moving picture.

Preferably, in accordance with the discrimination data, the still picture data is held in a still picture memory 62A, and the moving picture data is held in a moving picture memory 62B, whereby the data can be written or read more simply. Namely, the compressed image data of the moving picture or the still picture is held in respective memory in the order of transmission, whereby the data amount of image information can be reduced only by holding the shape of the moving picture or still picture area and the coordinates data.

(Embodiment 9)

Figure 12:
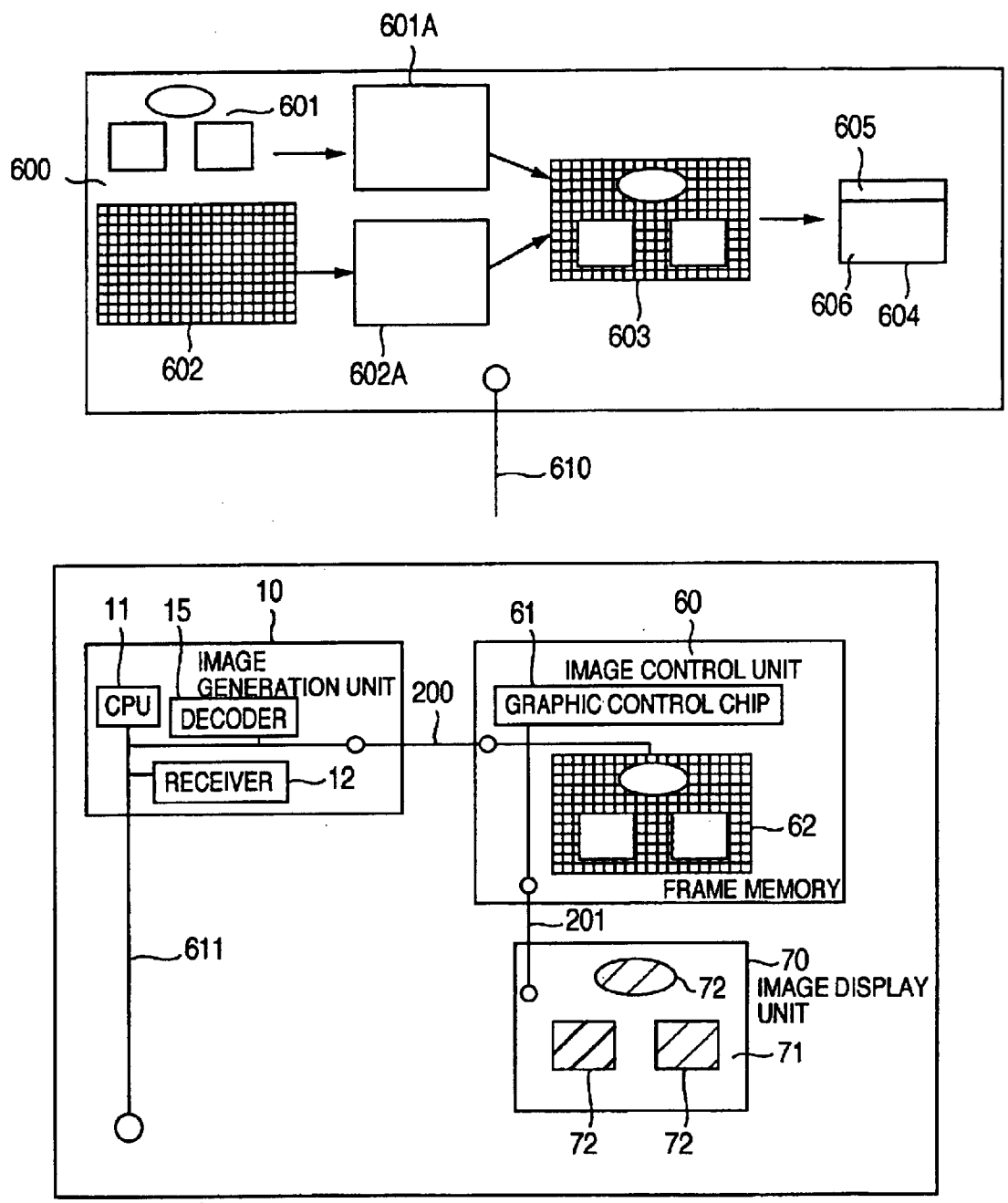
FIG. 12 is a block diagram showing one example of a broadcasting form of the present invention.

Referring to FIG. 12, an embodiment 9 of a broadcasting form using the embodiments 1 to 8 will be described below. A broadcasting station 600 has a moving picture 601 taken by a TV camera, and a still picture 602 picked up by a digital still camera and CG, for example, in which respective image data are held in the memories 601A and 602A, a picture 603 composed of the moving picture and still picture is produced in accordance with the purpose, the image data is compressed and arranged by the methods of the embodiments 1 to 8, thereafter compressed in accordance with the MPEG4 that is the compression form for broadcasting, and held in a memory 606. In the memory 606, the data is described as a data format at 605, and the image data is held in 604. This compressed image data is provided wireless or by wire 610 to the consumer. With the consumer, a receiver 12 receives the image information wireless or by wire 611 from the broadcasting station, and a decoder 15 decodes the compression method of the broadcasting form. Thereafter, the image information is transmitted to the image control unit 60, and then transmitted to the image display unit by the methods of the embodiments 1 to 8. In the above broadcasting form, the broadcasting station can register the hardware environment of the consumer beforehand or in real time, and assess the broadcasting service rate, when the consumer has the image control unit for controlling in the embodiments 1 to 8 and the image display unit for displaying the image. Also, for the consumer having the conventional image control unit and image display unit, the broadcasting station can register the hardware environment of the consumer beforehand or in real time and assess the broadcasting service rate that is different from the above service rate. The user having the conventional image display system can not display the moving picture and the still picture separately, and after the received data is encoded, the image data in the moving picture area is received at a period of 531A, 531B in FIG. 10, and the image data in the still picture area, or the image data 510A, 510E in FIG. 4, is received at the same period, whereby the moving picture performance is degraded in a case of the hold type image display unit with low definition. Therefore, the still picture and the moving picture can be displayed in high image quality in the broadcasting form of the embodiment 9.

(Embodiment 10)

Referring to FIGS. 13 to 19, an embodiment 10 of the image display unit 70 for use in the image display system will be described below.

Figure 13:
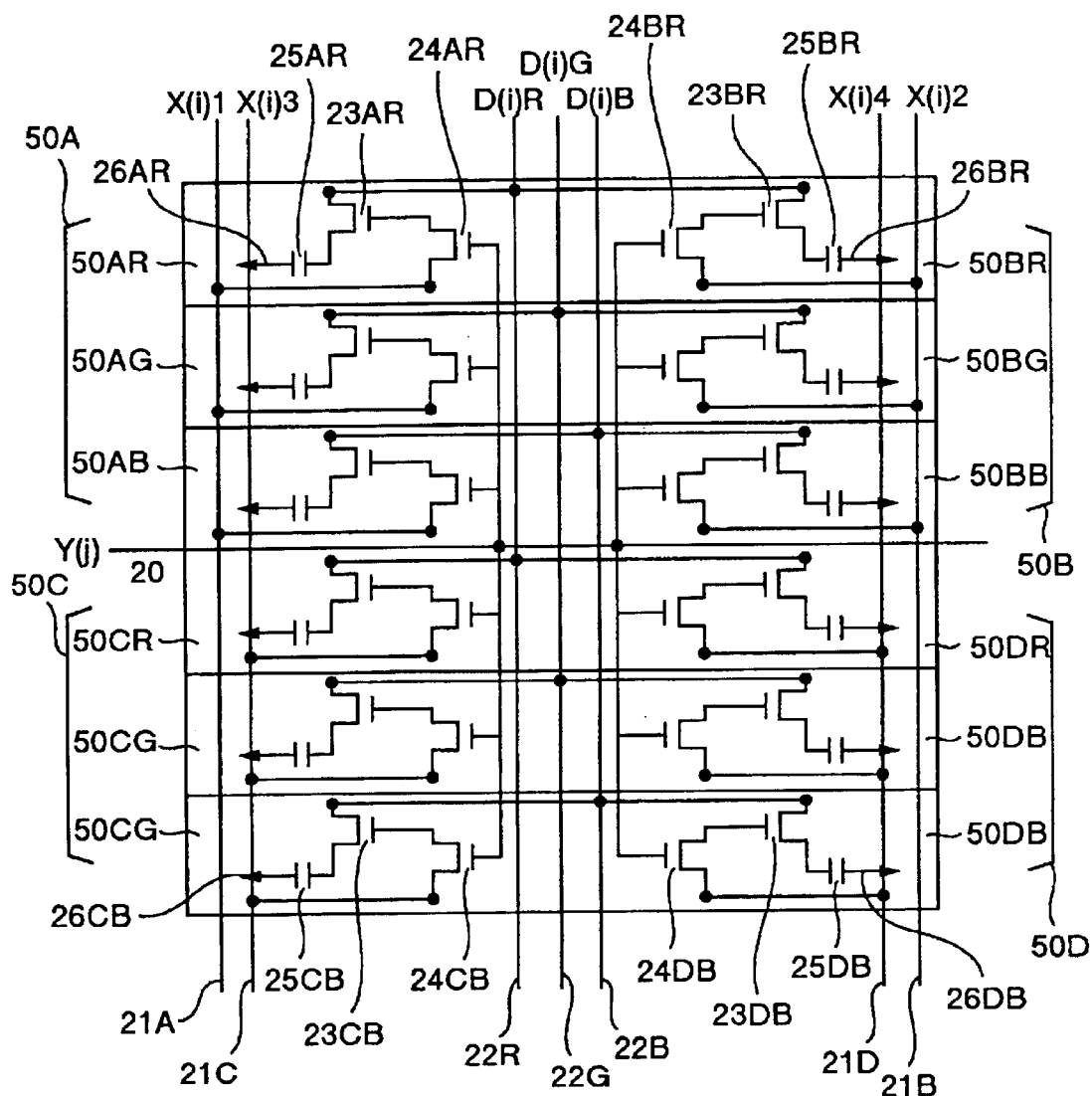
FIG. 13 is a circuit diagram showing one example of an image display unit of the present invention.

FIG. 13 is an equivalent circuit diagram showing an example of a pixel circuit configuration of the image display unit that can display the moving picture area and the still picture area separately according to the invention. The embodiment 10 has the pixel circuit configuration having four pixels of 2×2 pixels as one block, and a number of pixel circuits are arranged to form an entire display area of the image display unit. Note that the image display unit applied to the image display system of the invention is not limited to the liquid crystal display, but is also applicable to ELD, FED and PDP. In this embodiment 10 of the invention, the liquid crystal display is exemplified as it is most suitable.

The liquid crystal display of the embodiment 10 has a lighting system on the back face, and comprises a pair of transparent substrates having a polarizing plate and a liquid crystal layer sandwiched between the pair of transparent substrates, in which an electric field is applied to the liquid crystal layer to control a polarized state of the liquid crystal layer to display the image.

FIG. 13 shows one block of four pixels. Although all the components of each pixel are not designated by numerals, each numeral of component is suffixed with character A for the upper left pixel, B for the upper right pixel, C for the lower left pixel, and D for the lower right pixel, and further, the character is suffixed with character R, G or B corresponding to red, green or blue pixel. In the embodiment 10, one block is formed of four pixels 50A, 50B, 50C and 50D, one pixel consisting of three elements of red (50AR, 50BR, 50CR, 50DR), green (50AG, 50BG, 50CG, 50DG), and blue (50AG, 50BB, 50CG, 50DG). A scanning wire 20 common to four pixels is formed centrally, and is connected to the gates of twelve thin film transistors (24AR, 24BR, 24CB, 24DB) that are the first switch. Also, a block selection signal wiring 21A is connected to the drain electrodes of the thin film transistors 24AR, 24AG and 24AB that are the first switch; a block selection signal wiring 21B is connected to the drain electrodes of the thin film transistors 24BR, 24BG and 24BB; a block selection signal wiring 21C is connected to the drain electrodes of the thin film transistors 24CR, 24CG and 24CB; and a block selection signal wiring 21D is connected to the drain electrodes of the thin film transistors 24DR, 24DG and 24DB. Also, the source electrodes of the thin film transistors that are the first switch are connected to the gate electrodes of twelve thin film transistors (23AR, 23BR, 23CB, 23DB, etc.) that are the second switch. Further, a red image signal wiring 22R, a green image signal wiring 22G and a blue image signal wiring 22B are connected to the drain electrodes of the thin film transistors that are the second switch; pixel electrodes are connected to the source electrodes of the thin film transistors that are the second switch, and connected via a liquid crystal layer to the opposite electrodes (26AR, 26BR, 26CB, 26DB, etc.) to form pixel portions (25AR, 25BR, 25CB, 25DB, etc.). Note that the opposite electrodes are commonly used for all the pixels, with a holding capacitor formed in parallel with the pixel portions (25AR, 25BR, 25CB, 25DB, etc.). With such a pixel configuration, the display of separated image area is enabled in which the moving picture area and the still picture area are separated.

Figure 14:
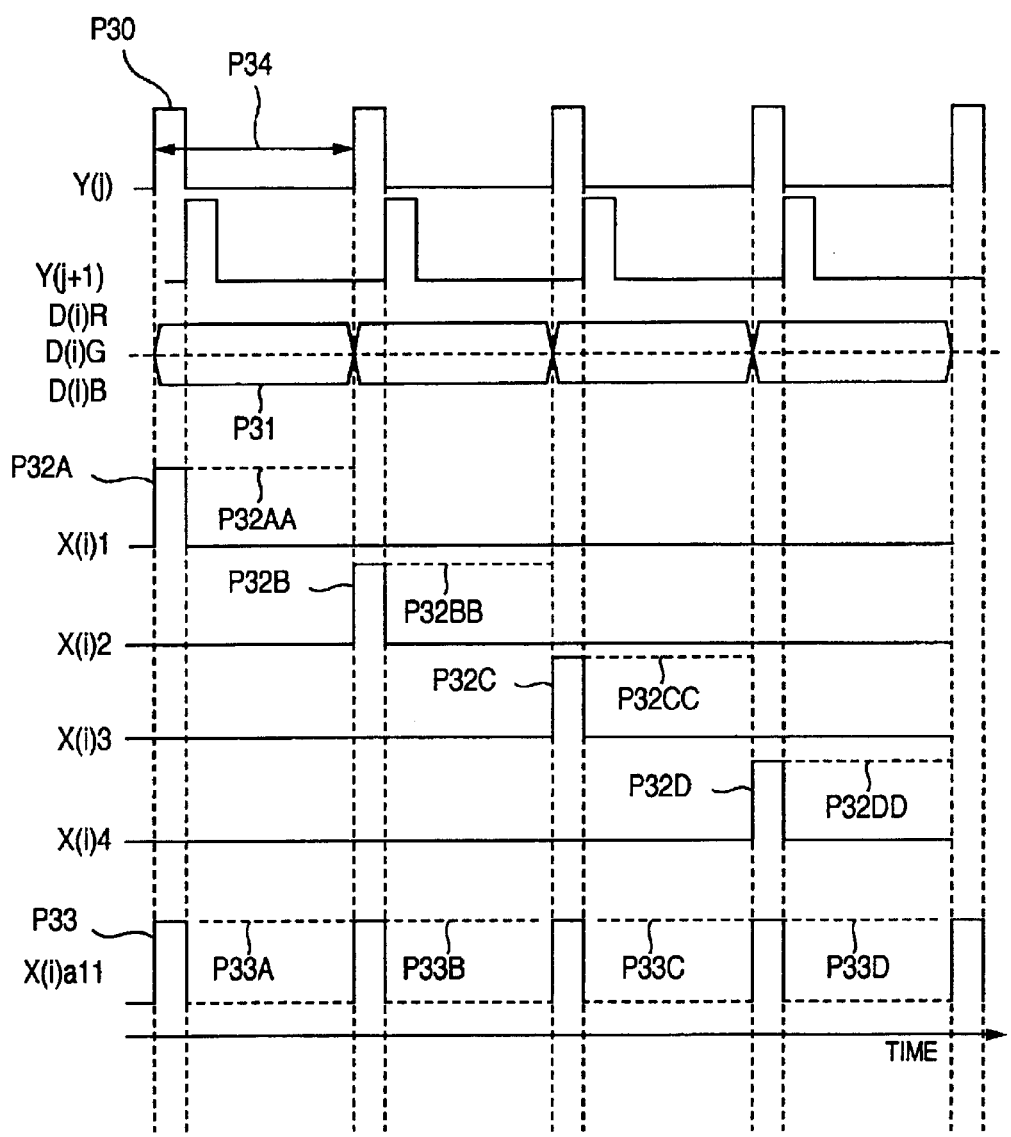
FIG. 14 is a driving voltage waveform showing one example of the image display unit of the present invention.

Specifically, a driving voltage waveform that is applied to each wire to display the image area separately is shown in FIG. 14. Consider a scanning wire Y(j) at the j-th order. A gate voltage 30 for turning on the thin film transistors that are the first switch is applied to the scanning wire Y(j) at every frame period 34. In synchronism with this gate voltage 30, the voltages 32A to 32D are applied to 21A to 21D that are block selecting signal wires $X(I)_1$ to $X(I)_4$ in the still image display area at every four frames in accordance with the discrimination signal 410, and an image signal 31 corresponding to red $D(I)_R$, green $D(I)_G$ and blue $D(I)_B$ is applied through the second switch to the pixels in synchronism with this gate voltage 30. Accordingly, any one of the pixels 50A, 50B, 50C and 50D is only selected. For the pixels not selected, the voltage is held during four frames. On one hand, in the moving picture display area, a voltage 33 is applied to 21A to 21D that are block selecting signal wires $X(I)_{a11}$ at every frame in accordance with the discrimination signal 410, and an image signal 31 corresponding to red $D(I)_R$, green $D(I)_G$ and blue $D(I)_B$ is applied through the second switch to the pixels in synchronism with this gate voltage 30. Accordingly, the same signal is applied to all of the pixels 50A, 50B, 50C and 50D, whereby the same display for four pixels can be rewritten for every frame. For a scanning wire Y(j) at the j+1-th order, like the j-th scanning wire, whether the high definition display area or the low definition display area is discriminated, and the image area can be displayed separately by inputting the driving waveform. Accordingly, if the still picture is displayed in the high definition area, and the moving picture is displayed in the low definition area, the moving picture can be rewritten at high speed and the still picture displayed at high definition or high density, even when the moving picture and the still picture are mixed. As shown in FIG. 5, when the slow speed moving picture is displayed, block selecting signal wires $X(I)_1$ to $X(I)_4$ are selected in accordance with the discrimination signal 410, whereby the slow speed moving picture can be displayed in two frames.

Figure 15:
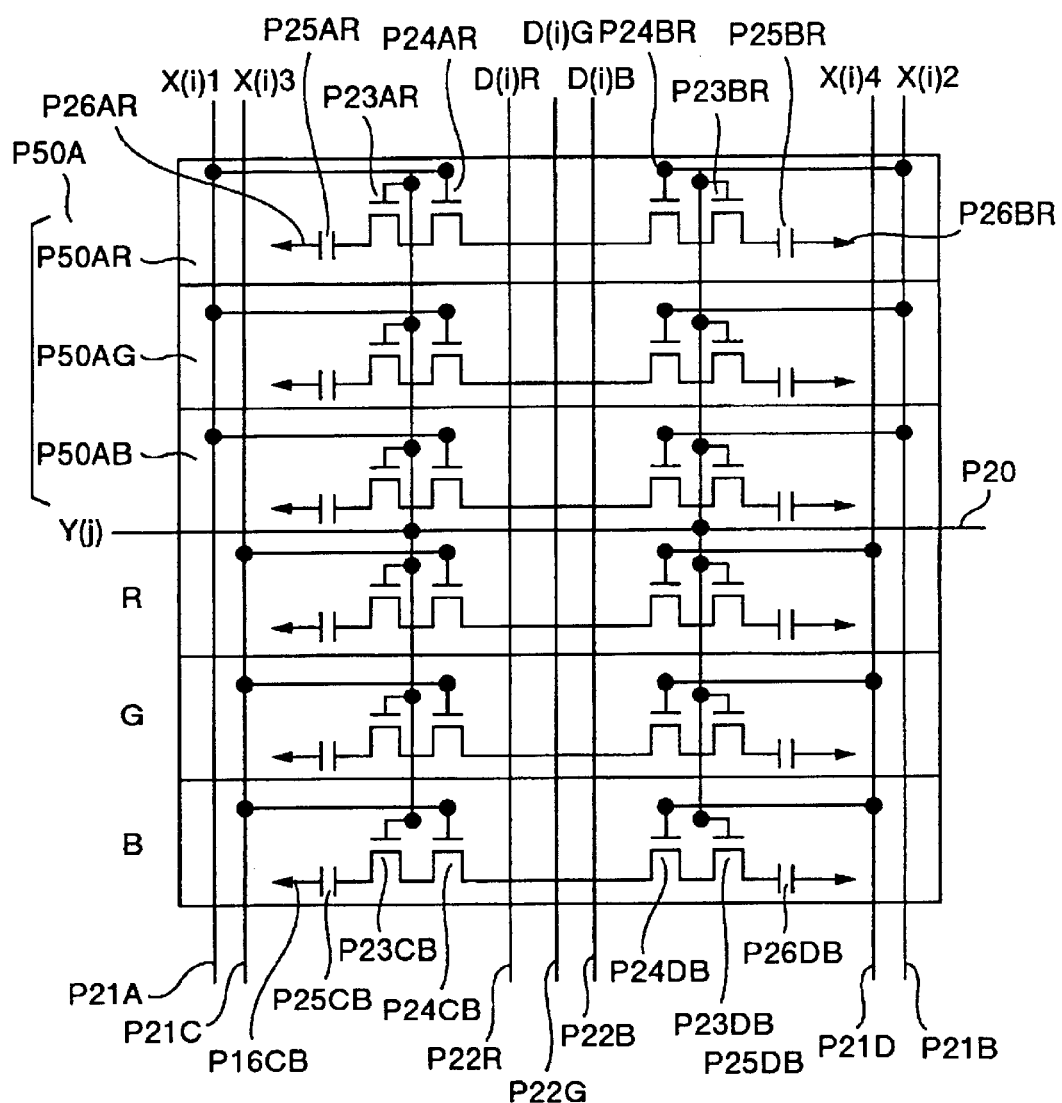
FIG. 15 is a circuit diagram showing one example of the image display unit of the present invention.

Another example of the pixel circuit configuration for displaying the image area separately is shown in FIG. 15. The example involves the pixel circuit configuration having 2×2 pixels as one block, and a number of pixel circuits are arranged to form an entire display area of the image display unit. Note that one unit of block is not limited to four pixels. And the image display unit with the image area separation display system of the invention is not limited to the liquid crystal display, but is also applicable to EL display, FED and PDP. In this example, the liquid crystal display is exemplified as it is most suitable. In this embodiment 10, the liquid crystal display of the embodiment 10 has a lighting system on the back face, and comprises a pair of transparent substrates having a polarizing plate and a liquid crystal layer sandwiched between the pair of transparent substrates, in which an electric field is applied to the liquid crystal layer to control a polarized state of the liquid crystal layer to display the image. In the embodiment 10, one block is formed of four pixels 50A, 50B, 50C and 50D, one pixel consisting of three elements of red (50AR, 50BR, 50CR, 50DR), green (50AG, 50BG, 50CG, 50DG), and blue (50AB, 50BB, 50CB, 50DB). FIG. 15 shows four pixels. Although all the components of each pixel are not designated by numerals, each numeral of component is suffixed with character A for the upper left pixel, B for the upper right pixel, C for the lower left pixel, and D for the lower right pixel, and further, the character is suffixed with character R, G or B corresponding to red, green or blue pixel. A scanning wire 20 common to four pixels is formed centrally, and is connected to the gates of twelve thin film transistors (24AR, 24BR, 24CB, 24DB, etc.) that are the first switch. Also, a block selection signal wiring 21A is connected to the gate electrodes of the thin film transistors 23AR, 23AG and 23AB that are the second switch; a block selection signal wiring 21B is connected to the gate electrodes of the thin film transistors 23BR, 23BG and 23BB; a block selection signal wiring 21C is connected to the gate electrodes of the thin film transistors 23CR, 23CG and 23CB; and a block selection signal wiring 21D is connected to the gate electrodes of the thin film transistors 23DR, 23DG and 23DB. Also, the electrodes (26AR, 26BR, 26CB, 26DB, etc.) are connected to the drain electrodes of the second switch, and commonly used. A red image signal wiring 22R, a green image signal wiring 22G and a blue image signal wiring 22B are connected to the drain electrodes of the thin film transistors that are the first switch, respectively, and the source electrodes of the thin film transistors that are the first switch become pixel electrodes, and the source electrodes of the thin film transistors (23AR, 23BR, 23CB, 23DB, etc., twelve transistors) are formed with opposite electrodes, a liquid crystal layer being sandwiched between the pixel electrode and the opposite electrode to form the pixel portions (25AR, 25BR, 25CB, 25DB, etc.). The pixel portions (25AR, 25BR, 25CB, 25DB, etc.) have a holding capacitor disposed in parallel. With such a pixel configuration, the display of separated image area is enabled in which the moving picture area and the still picture area are separated.

The driving voltage waveform that is applied to each wire to display the image area separately is similar to that of FIG. 14. Accordingly, if the still picture is displayed in the high definition area, and the moving picture is displayed in the low definition area, the moving picture can be rewritten at high speed and the still picture displayed at high definition or high density, even when the moving picture and the still picture are mixed.

Figure 16:
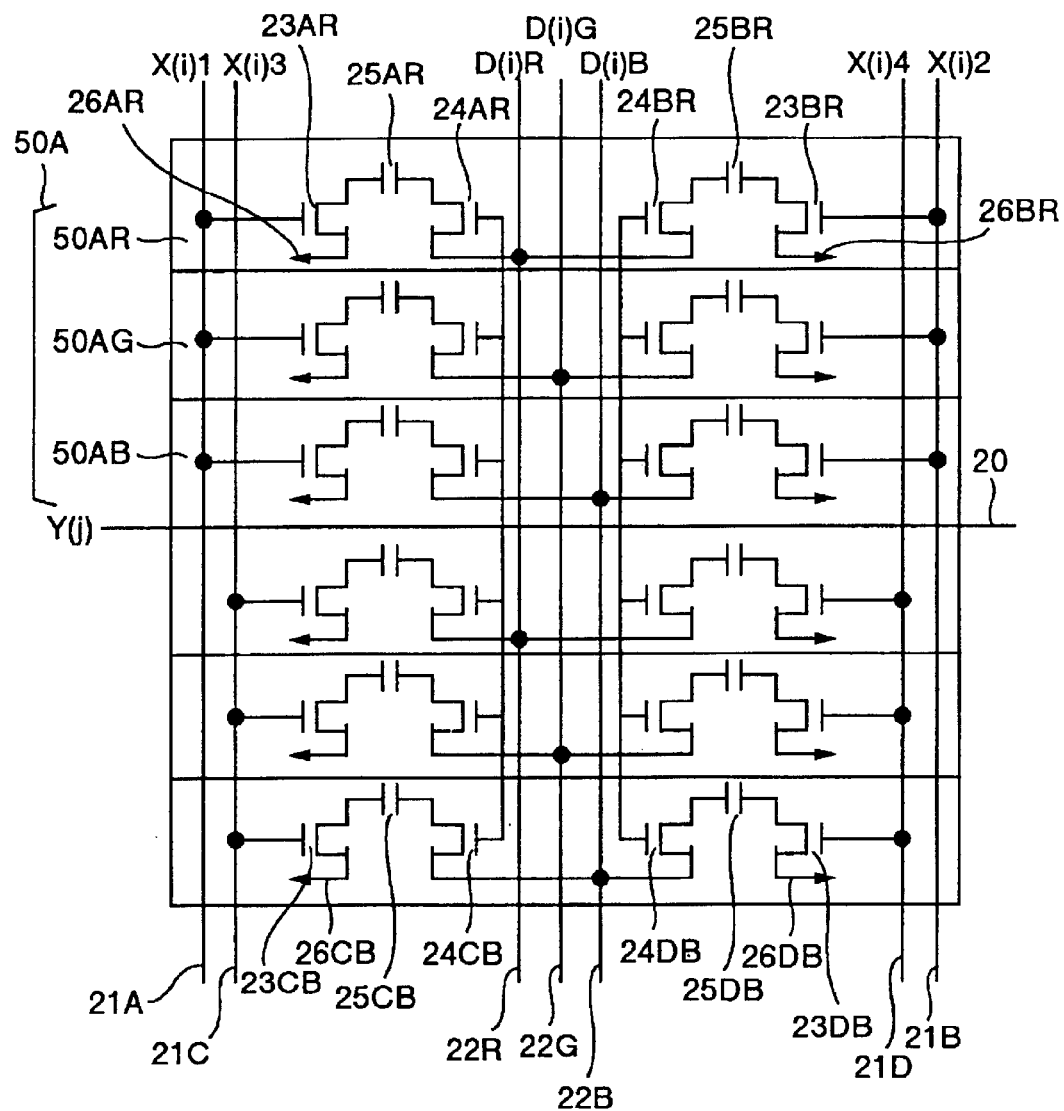
FIG. 16 is a circuit diagram showing one example of the image display unit of the present invention.

Another example of the pixel circuit configuration for displaying the image area separately is shown in FIG. 16. The example involves the pixel circuit configuration having 2×2 pixels as one block, and a number of pixel circuits are arranged to form an entire display area of the image display unit. Note that one unit of block is not limited to four pixels, but considering the decrease in opening ratio due to more wires, one block of four pixels is preferable. And the image display unit with the image area separation display system of the invention is not limited to the liquid crystal display, but is also applicable to EL display, FED and PDP. In this example, the liquid crystal display is exemplified as it is most suitable. In this embodiment 10, the liquid crystal display of the embodiment 10 has a lighting system on the back face, and comprises a pair of transparent substrates having a polarizing plate and a liquid crystal layer sandwiched between the pair of transparent substrates, in which an electric field is applied to the liquid crystal layer to control a polarized state of the liquid crystal layer to display the image. In the embodiment 10, one block is formed of four pixels 50A, 50B, 50C and 50D, one pixel consisting of three elements of red (50AR, 50BR, 50CR, 50DR), green (50A, 50BG, 50CG, 50DG), and blue (50AB, 50BB, 50CB, 50DB). FIG. 16 shows four pixels. Although all the components of each pixel are not designated by numerals, each numeral of component is suffixed with character A for the upper left pixel, B for the upper right pixel, C for the lower left pixel, and D for the lower right pixel, and further, the character is suffixed with character R, G or B corresponding to red, green or blue pixel. A scanning wire 20 common to four pixels is formed centrally, and is connected to the gates of twelve thin film transistors (24AR, 24BR, 24CB, 24DB, etc.) that are the first switch. Also, a red image signal wiring 22R, a green image signal wiring 22G and a blue image signal wiring 22B are connected to the drain electrodes of the thin film transistors 24AR, 24AG and 24AB that are the first switch, respectively. A block selection signal wiring 21A is connected to the gate electrodes of the thin film transistors (23AR, 23AG, 23AB) that are the second switch; a block selection signal wiring 21B is connected to the gate electrodes of the thin film transistors (23BR, 23BG, 23BB); a block selection signal wiring 21C is connected to the gate electrodes of the thin film transistors (23CR, 23CG, 23CB); and a block selection signal wiring 21D is connected to the gate electrodes of the thin film transistors (23DR, 23DG, 23DB). Also, the source electrodes of the thin film transistors that are the first switch are connected to the drain electrodes of the thin film transistors that are the second switch. Further, the pixel electrodes are connected to the source electrodes of the thin film transistors that are the second switch, a liquid crystal layer being sandwiched between the pixel electrode and the opposite electrode (26AR, 26BR, 26CB, 26DB, etc.) to form the pixel portions (25AR, 25BR, 25CB, 25DB, etc.). Note that the opposite electrodes (26AR, 26BR, 26CB, 26DB, etc.) are commonly used for all the pixels. The pixel portions (25AR, 25BR, 25CB, 25DB, etc.) have a holding capacitor disposed in parallel. With such a pixel configuration, the display of separated image area is enabled.

The driving voltage waveform that is applied to each wire to display the image area separately is similar to that of FIG. 14. Accordingly, if the still picture is displayed in the high definition area, and the moving picture is displayed in the low definition area, the moving picture can be rewritten at high speed and the still picture displayed at high definition or high density, even when the moving picture and the still picture are mixed.

Figure 17:
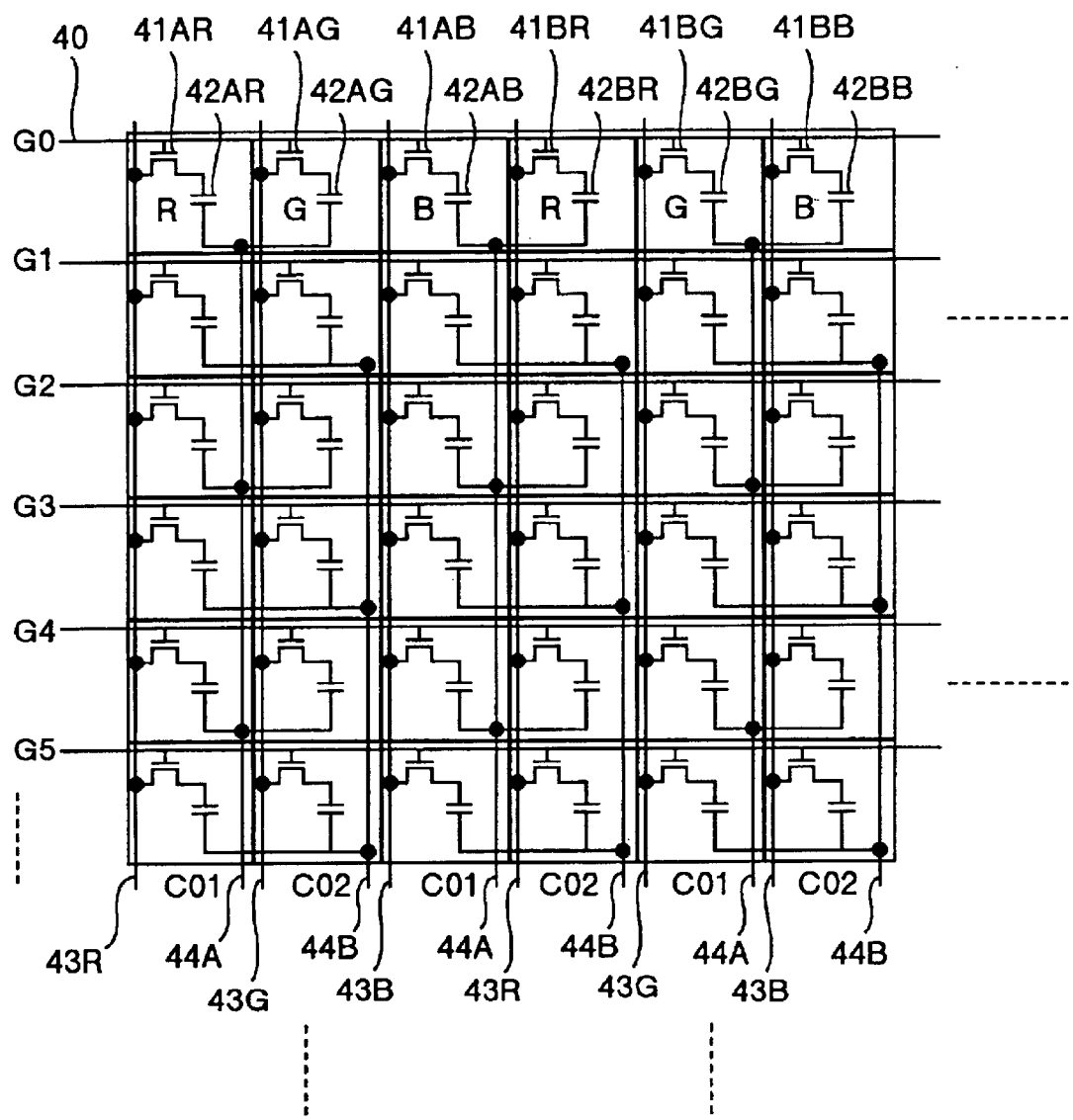
FIG. 17 is a circuit diagram showing one example of the image display unit of the present invention.

Another example of the pixel circuit configuration for displaying the image area separately is shown in FIG. 17. The example involves the pixel circuit configuration having 2×2 pixels as one block, and a number of pixel circuits are arranged to form an entire display area of the image display unit. Note that one unit of block is not limited to four pixels, but considering the decrease in opening ratio due to more wires, one block of four pixels is preferable. And the image display unit with the image area separation display system of the invention is not limited to the liquid crystal display, but is also applicable to EL display, FED and PDP. In this example, the liquid crystal display is exemplified as it is most suitable. In this embodiment 10, the liquid crystal display of the embodiment 10 has a lighting system on the back face, and comprises a pair of transparent substrates having a polarizing plate and a liquid crystal layer sandwiched between the pair of transparent substrates, in which an electric field is applied to the liquid crystal layer to control a polarized state of the liquid crystal layer to display the image. In the embodiment 10, one block is formed of four pixels 50A, 50B, 50C and 50D, one pixel consisting of three elements of red (50AR, 50BR, 50CR, 50DR), green (50AG, 50BG, 50CG, 50DG), and blue (50AB, 50BB, 50CB, 50DB). A pixel structure is such that a scanning wire 40 is connected to the gate electrode of the thin film transistors (41AR, 41AG, 41AB, etc.) that are the switch for every pixel. Also, a red image signal wiring 43R, a green image signal wiring 43G and a blue image signal wiring 43B are connected to the drain electrodes of the thin film transistors 41, respectively. Also, the pixel electrodes are connected to the source electrodes of the thin film transistors 41, a liquid crystal layer being sandwiched between the pixel electrode and the opposite electrode 44 to form the pixel portions 42. Note that the opposite electrodes 44 are commonly used for every two pixels in the transverse direction, and further for every line, whereby two kinds of opposite electrodes 44A, 44B are made up. With such a pixel configuration, the pixel structure can be simplified as compared with those of the embodiments 1 to 3, and the manufacturing process can be reduced in order to realize low cost.

Figure 18:
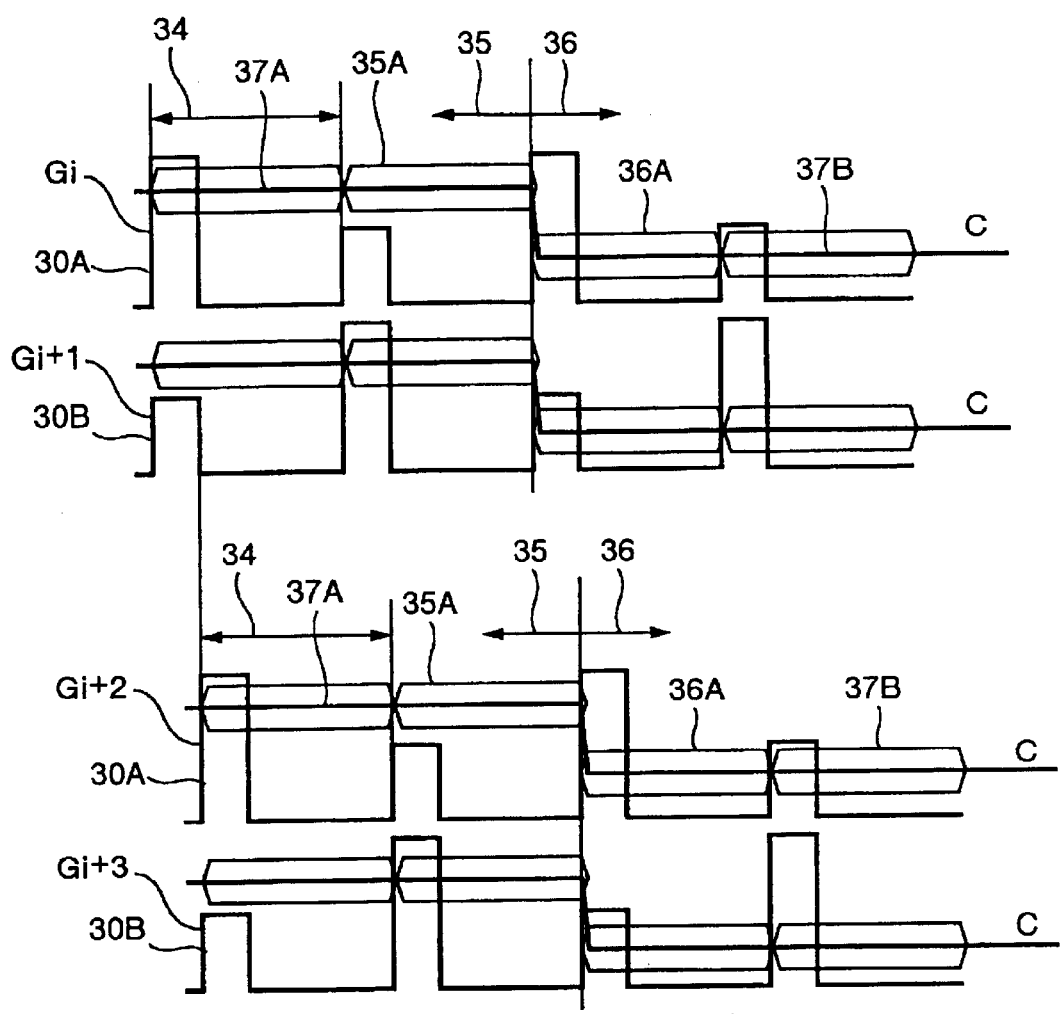
FIG. 18 is a driving voltage waveform showing one example of the image display unit of the present invention.

The driving voltage waveform that is applied to each wire to display the image area separately is shown in FIG. 18. Consider Gi and Gi+1 for the i-th and i+1-th scanning wires 40. A gate voltage 30A at two levels is applied to a scanning wire Gi at every frame period 34, and a gate voltage 30B that is inversed from the gate voltage 30A at two levels is applied to a scanning wire Gi+1 at the same time. For the convenience of explanation, the area of a time 35 is made a high definition display area, and the area of a time 36 is made a low definition display area. Then, during the high definition display time 35, the opposite electrode 44 is high at a potential 37A, with an image signal 35A put high. The thin film transistor 41 is kept from being turned on at a lower level of the two levels of the gate voltages 30A, 30B, and the thin film transistor 41 is only turned on at a higher level of the two levels of the gate voltages 30A, 30B. Within 2×2 pixels (12 picture elements), 6 picture elements are written and the remaining 6 picture elements are held. At the next frame, the voltage levels of Gi and Gi+1 in the scanning wire 40 are inversed, the data of picture elements written at the previous frame are held and the data of picture elements held at the previous frame are rewritten. On the other hand, during the low definition display time 36, the opposite electrode 44 is low at a potential 37B, with an image signal 36A put low. The thin film transistor 41 is turned on at two levels of the gate voltages 30A, 30B. Within 2×2 pixels (12 picture elements), 12 picture elements are all written. Accordingly, the image is composed of two frames in the high definition area, while the image is rewritten at high speed for every frame in the low definition area.

For the next scanning wires Gi+2 and Gi+3, the high definition display area or the low definition display area is discriminated, and the above driving waveform is entered, whereby the image area can be displayed separately. Accordingly, if the still picture is displayed in the high definition area, and the moving picture is displayed in the low definition area, the moving picture can be rewritten at high speed and the still picture displayed at high definition or high density, even when the moving picture and the still picture are mixed.

Figure 19:
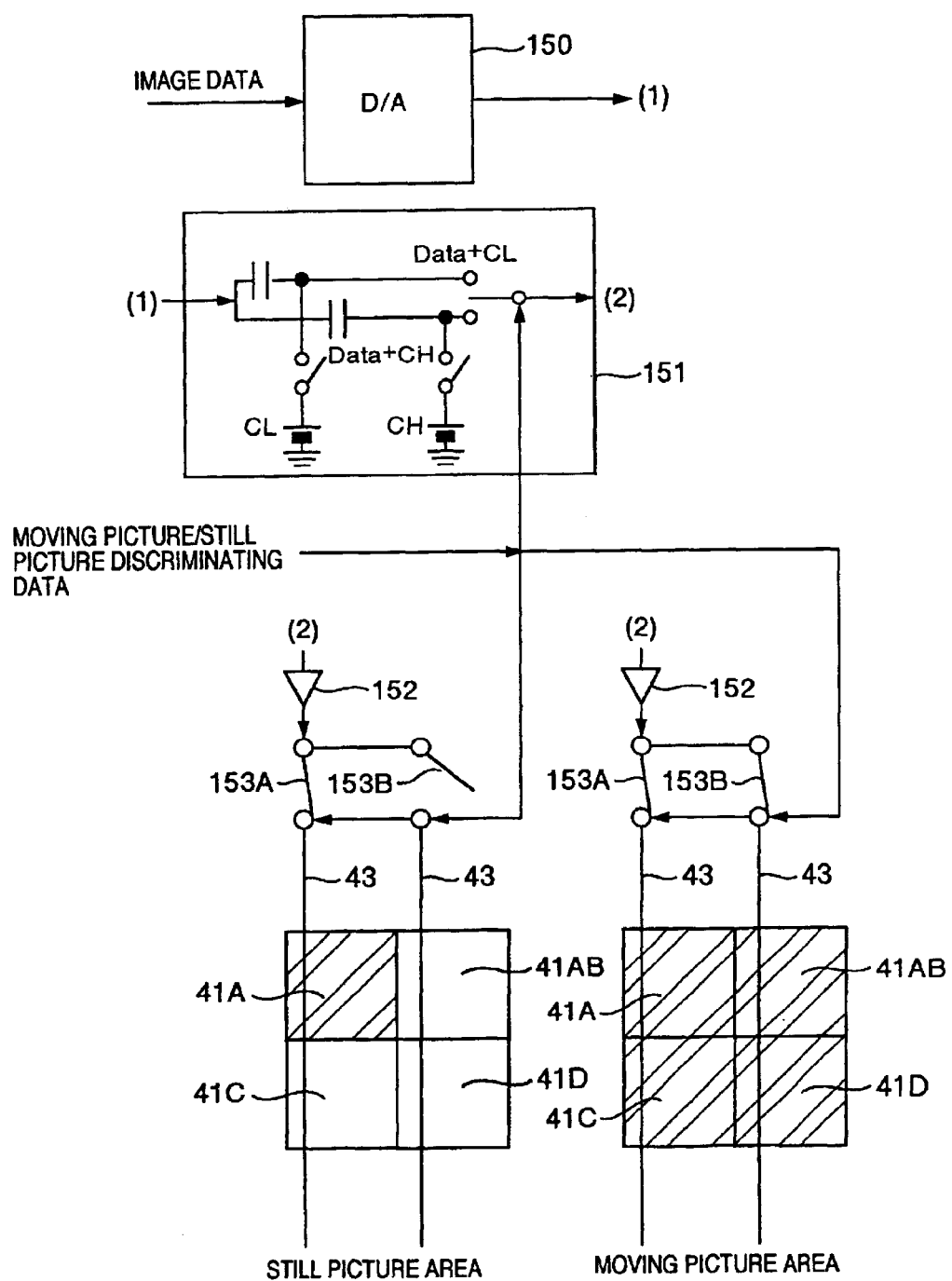
FIG. 19 is a level shift circuit diagram showing one example of the image display unit of the present invention.

A circuit configuration in which the image signals 35A and 36A has the level of voltage shifted in the embodiment 10 is shown in FIG. 19. First of all, the image data from the image control unit is converted by a D/A converter 150, a high level signal 35A or a low level signal 36A is selected in accordance with the discrimination data for discriminating between the moving picture and the still picture by a level shifter 151, and the signal is applied through an amplifier 152 to the signal wiring 43. At this time, in the case of the still picture display at high definition, the high level signal 35A obtained by the level shifter 151 is applied through the signal wiring 43 to one pixel 41 within the block. At the next frame, the pixels written at this time are held, and different pixels are written, whereby the high definition display is enabled. In the case of the moving picture display at low definition, the low level signal 36A obtained by the level shifter 151 is applied through the signal wiring 43 to all the pixels 41 within the block. Also, in the high definition area, one pixel within one block is selected and displayed, but if the level shifter 151 is arranged for every signal wiring 43, diagonal pixels 41A, 41D (similarly 41B, 41C) can be written at the same time. Further, at the time of low definition display, if the level shifter 151 is arranged for every signal wiring 43, a same signal can be written into the pixels 41A and 41C, and a same signal that is different from the previous same signal can be written into the pixels 41B and 41D at the same time.

Accordingly, in the embodiment 10, the display with different definitions is enabled by selecting arbitrary area for every scanning line 40. Further, the pixel structure can be simply made in the almost same manner as the conventional structure only by dividing the opposite electrodes, whereby the image area separation display system can be implemented. Also, with this system, any area having two or more pixels and an integral multiple of two pixels can be selected in the direction of the scanning line 40.

(Embodiment 11)

Figure 20:
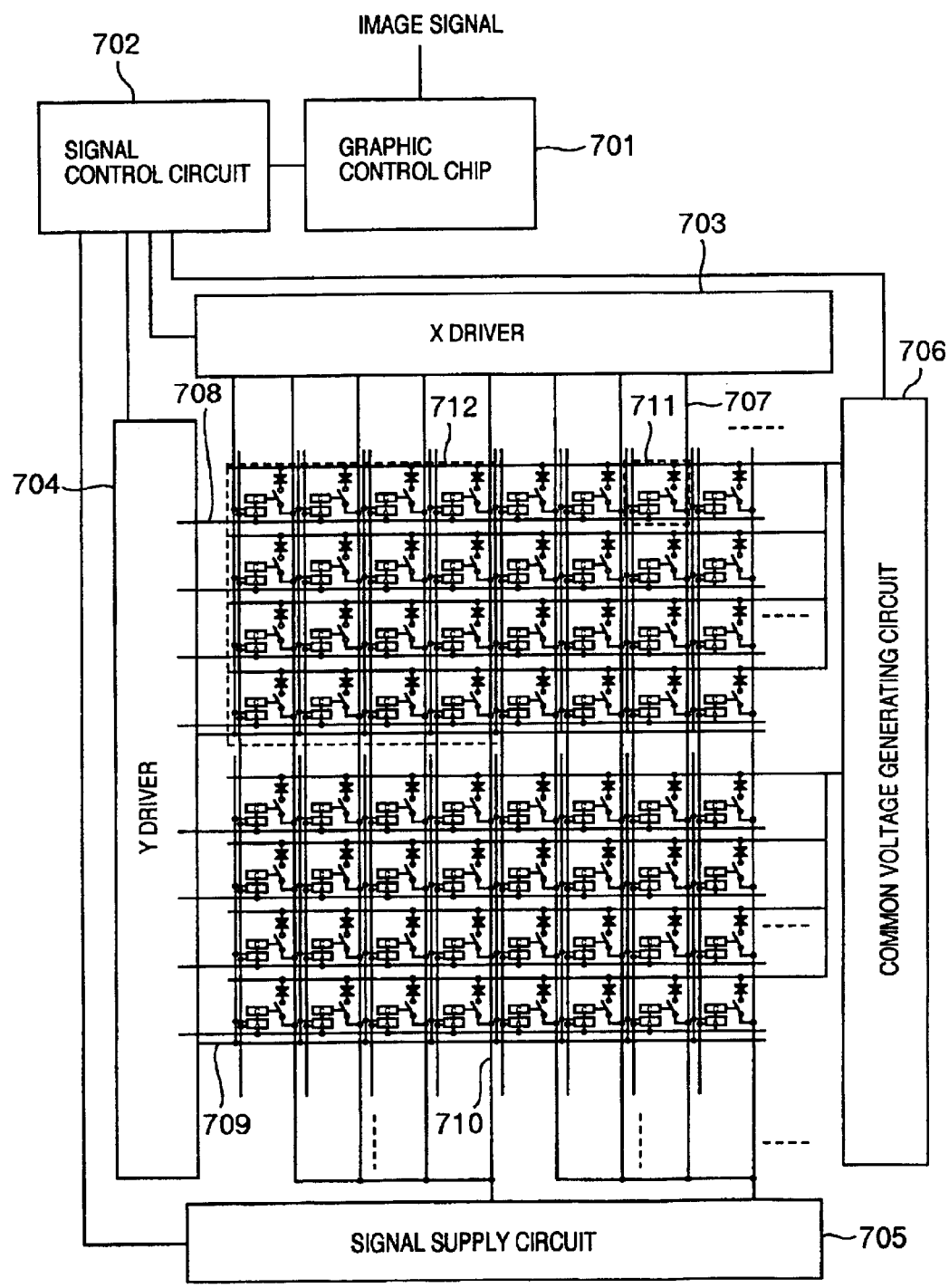
FIG. 20 is a block diagram showing one example of another image display unit employing an image compression method of the present invention.
Figure 21:
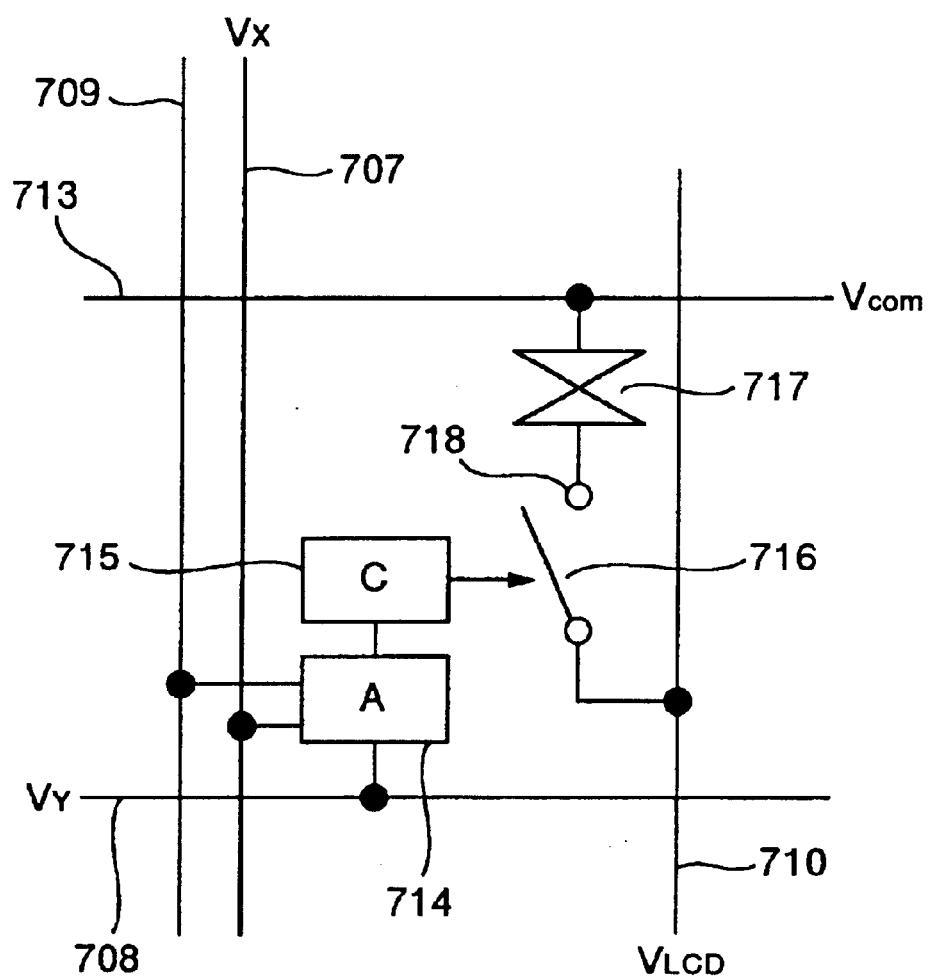
FIG. 21 is a circuit diagram of another image display unit employing the image compression method of the present invention.
Figure 22:
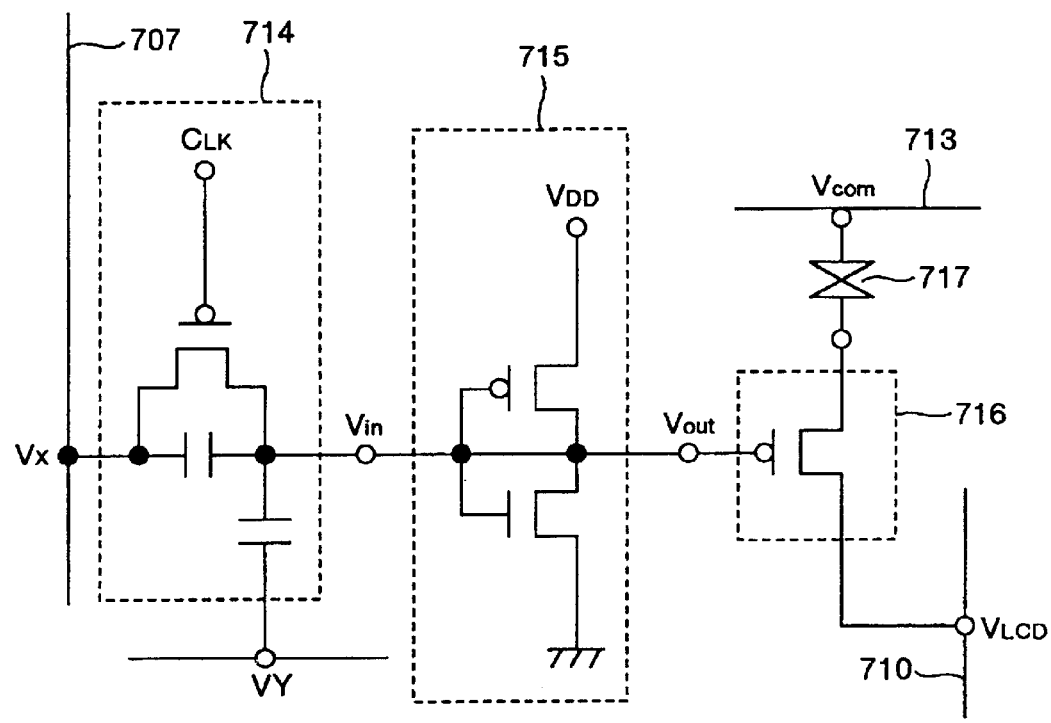
FIG. 22 is a circuit diagram of another image display unit employing the image compression method of the present invention.

Referring to FIGS. 20 to 22, an embodiment 11 will be described below in which the transmission system as explained in the embodiment 1 is employed in other image display units. FIG. 20 is a block diagram showing the overall configuration of an image display unit, in which each pixel has a transistor circuit portion for controlling a switch connected to the liquid crystal layer to be turned on or off in accordance with a summation of voltages input from the X direction and the Y direction, and a signal supply wiring commonly used in the series of pixels (four wires extending from the signal supply circuit are commonly used in FIG. 20). Thereby, this image display unit can process the pixels in a unit of block, and display the pixels in a unit of block.

The image display unit and the transmission method will be set forth below. A circuit configuration of each pixel is shown in FIGS. 21 and 22. Note that a common wire connected to one electrode for carrying the liquid crystal layer is commonly used for plural pixels (four pixels in FIG. 20), whereby a plurality of lines can be controlled at the same time.

Referring to FIG. 21, each pixel has an X signal line 707 for inputting a voltage from the X direction, a Y signal line 708 for inputting a voltage from the Y direction, an XY operation circuit portion 714 for operating the voltages entered from the X direction and the Y direction to output a signal, a signal comparator 715 for controlling a pixel switch to be turned on or off to regulate the orientation of the liquid crystal layer in accordance with a signal of the XY operation circuit portion, and a liquid crystal driving signal line 710 (common for plural columns of pixels) for supplying a voltage to the liquid crystal layer. FIG. 22 shows a specific circuit configuration and FIG. 21 shows the configuration of transistors to implement this circuit configuration. For more details of this image display unit, refer to JP-A-2000-172940.

This image display unit can control the writing into the liquid crystal layer in accordance with the voltage values entered from the X direction and the Y direction. Namely, a voltage is applied to a desired number of X signal lines and Y signal lines at a time and a plurality of pixels in the X direction and the Y direction can be controlled for display. And the pixels can be driven in a unit of pixel or in a unit of block by adjusting the voltages entered from the X direction and the Y direction (i.e., calculating a combination of voltages in the X direction and the Y direction for the signal comparator to issue an ON instruction of the pixel switch (an instruction for writing liquid crystal driving voltage) to a desired number of pixels alone). Since the signal supply circuit is common to plural columns of pixels, the same liquid crystal driving voltage can be applied at a time to plural pixels selected. Thereby, the faster display than by the ordinary line scanning, viz., the transmission of compressed image and its display in a unit of block as described in the embodiment 1, is enabled. Note that the XY operation circuit portion is connected to the clock signal line. In practice, the XY operation circuit portion operates the voltages applied from the X signal line and the Y signal line, and outputs a signal of the result in accordance with a clock signal voltage that is applied to the column of pixels to be driven. This driving is performed twice within one frame period to enable the image compression display of two gradations. Of course, this number of gradations is variable.

As described above, the compressed image information of the embodiment 1 (e.g., image information with 4×4 pixels compressed at two gradations) is input into the image display unit as shown in FIGS. 20 to 22, and displayed. Viz., the original image information to be input is compressed by the graphic control chips, with the number of gradations reduced, and passed to the image display unit. And the image display unit can display the image information with the number of gradations reduced in a unit of pixel or in a unit of block by controlling the voltages applied to the X wiring and the Y wiring and the clock signal employing the signal control circuit within the image display unit. This means that the system of the invention has the selectivity of the image display unit.

With the above constitution, the high definition image can be displayed, by making use of the visual characteristics of the human being, and reducing the information with low degree of recognition.

By taking this constitution, the image transmission method adaptive to the high definition image display and the high speed image display which are consistently effected can be provided.

What is claimed is:

1. An image display system having:
   an image display unit; and
   a control unit for outputting image information to said image display unit,
   wherein said control unit comprises:
   a block discrimination circuit portion for discriminating a state of said image information amounting to one frame among the image information in a pixel block unit,
   an image processing portion for processing said pixel block unit including said image information based on a discriminated result of said block discrimination circuit portion,
   a storage portion for storing said image information processed by said image processing portion, and
   a synchronizing signal generation portion for reading said image information from said storage portion, controlling a clock in accordance with the read image information, and outputting the read image information to said image display unit,
   wherein said image processing portion processes said pixel block unit such that either each of a plurality of pixel block areas included in said pixel block unit is rewritten for each of a plurality of frames, or each pixel block area remains the same for a plurality of said frames.

2. The image display system according to claim 1, wherein said block discrimination circuit portion discriminates whether said image information is at least a moving picture or the still picture in said pixel block unit.

3. The image display system according to claim 2, wherein said image processing portion processes the image information differently depending on the discriminated result.

4. The image display system according to claim 3, wherein said image processing portion processes the image information at a smaller number of gradations when said discriminated result is the moving picture than when said discriminated result is the still picture.

5. The image display system according to claim 2, wherein said synchronizing signal generation portion controls the clock differently depending on the discriminated result of the state in said pixel block unit.

6. The image display system according to claim 5, wherein said synchronizing signal generation portion generates a faster clock in the clock control when said discriminated result is the moving picture than when said discriminated result is the still picture.

7. A television receiver having:
   an image display unit; and
   a control unit for outputting image information to said image display unit,
   wherein said control unit comprises:
   a receiving portion for receiving said image information,
   a block discrimination circuit portion for discriminating a state of image information amounting to one frame among the image information received by said receiving portion in a pixel block unit,
   an image processing portion for processing said pixel block unit including said image information based on a discriminated result of said block discrimination circuit portion, a storage portion for storing said image information processed by said image processing portion, and a synchronizing signal generation portion for reading said image information from said storage portion, controlling a clock in accordance with the read image information, and outputting the read image information to said image display unit, wherein said image processing portion processes said pixel block unit such that either each of a plurality of pixel block areas included in said pixel block unit is rewritten for each of a plurality of frames, or each pixel block area remains the same for a plurality of frames.

8. The image display system according to claim 7, wherein said block discrimination circuit portion discriminates whether said image information is at least a moving picture or a still picture in said pixel block unit.

9. An information processing device having:

an image display unit; and a control unit for outputting image information to said image display unit, wherein said control unit comprises:

a CPU for generating the image information, a block discrimination circuit portion for discriminating a state of said image information amounting to one frame among the image information generated by said CPU in a pixel block unit, an image processing portion for processing said pixel block unit including said image information based on a discriminated result of said block discrimination circuit portion, a storage portion for storing said image information processed by said image processing portion, and a synchronizing signal generation portion for reading said image information from said storage portion, controlling a clock in accordance with the read image information, and outputting the read image information to said image display unit, wherein said image processing portion processes said pixel block unit such that either each of a plurality of pixel block areas included in said pixel block unit is rewritten for each of a plurality of frames, or each pixel block area remains the same for a plurality of said frames.

10. The image display system according to claim 9, wherein said block discrimination circuit portion discriminates whether said image information is at least a moving picture or a still picture in said pixel block unit.

11. A transmitter for transmitting image information, comprising:

a block discrimination circuit portion for discriminating a state of image information amounting to one frame in a pixel block unit;

an image processing portion for processing said pixel block unit including said image information based on a discriminated result of said block discrimination circuit portion, and a transmitting portion for transmitting said image information, wherein said image processing portion processes said pixel block unit such that either each of a plurality of pixel block areas included in said pixel block unit is rewritten for each of a plurality of frames, or each pixel block area remains the same for a plurality of said frames.

12. The image display system according to claim 11, wherein said block discrimination circuit portion discriminates whether said image information is at least a moving picture or a still picture in said pixel block unit.

13. An image display system, comprising:

an image display unit;

a receiving portion for receiving image information;

a storage portion for storing said image information received by said receiving portion; and a synchronizing signal generation portion for reading said image information from said storage portion, controlling a clock in accordance with the read image information, and outputting read image information to said image display unit, wherein said image processing of said image information before being display is conducted by processing said pixel block unit such that either each of a plurality of pixel block areas included in said pixel block unit is rewritten for each of a plurality of frames, or each pixel block area remains the same for a plurality of said frames.

14. An image information transmission method, comprising the steps of:

discriminating a state of image information amounting to one frame among the image information in a pixel block unit;

processing said pixel block unit including said image information based on a discriminated result;

storing said image information which has been processed; and reading said image information, controlling a clock in accordance with the read image information, and outputting the read image information wherein said processing processes said pixel block unit such that either each of a plurality of pixel block areas included in said pixel block unit is rewritten for each of a plurality of frames, or each pixel block area remains the same for a plurality of said frame.

15. The image information transmission method according to claim 14, wherein the state of image information amounting to one frame among the image information is the state of at least a moving picture or a still picture, and further comprising discriminating the state of the moving picture or the still picture in said pixel block unit.

16. The image information transmission method according to claim 14, wherein said image information is the received information.

* * * * *